(12) United States Patent
Choulet

(10) Patent No.: US 6,538,772 B1
(45) Date of Patent: Mar. 25, 2003

(54) METHODS OF CONVERTING AND REPRODUCING AN IMAGE, AN INK TRANSFER MEMBER, AND A MEDIUM INCLUDING SUCH AN IMAGE

(75) Inventor: Luc Choulet, Macon (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/300,486

(22) Filed: Apr. 28, 1999

(30) Foreign Application Priority Data

Apr. 30, 1998 (FR) .......................................... 98 05501

(51) Int. Cl.⁷ .............................................. H04N 1/405
(52) U.S. Cl. ........................ 358/3.09; 382/237; 358/3.2
(58) Field of Search ........................ 358/1.9, 456–459, 358/3.07, 3.09, 3.13, 3.2, 3.24; 382/237, 251–253

(56) References Cited

U.S. PATENT DOCUMENTS

| | | | |
|---|---|---|---|
| 3,922,484 A | 11/1975 | Keller | 178/6 |
| 4,486,788 A | 12/1984 | Yamada | 358/298 |
| 5,588,094 A * | 12/1996 | Kroon | 358/1.9 |
| 5,689,344 A * | 11/1997 | Ebner | 358/298 |
| 6,141,121 A * | 10/2000 | Chen et al. | 358/1.9 |
| 6,167,166 A * | 12/2000 | Loce et al. | 382/266 |
| 6,252,679 B1 * | 6/2001 | Wang | 358/1.9 |

FOREIGN PATENT DOCUMENTS

| | | | |
|---|---|---|---|
| EP | 0 501 126 A | 9/1992 | |
| EP | 0 590 860 A | 4/1994 | |
| EP | 0 740 457 A | 10/1996 | |
| EP | 0 774 857 A | 5/1997 | |
| EP | 0774860 A2 * | 5/1997 | H04N/1/52 |

* cited by examiner

Primary Examiner—Thomas D. Lee
Assistant Examiner—Stephen Brinich
(74) Attorney, Agent, or Firm—Oliff & Berridge, PLC

(57) ABSTRACT

The invention relates to a conversion method for generating a half-tone image from a digitized image comprising a set of pixels each having a tone value, each pixel of the digitized image being associated with a base cell of the half-tone image, which base cell is subdivided into as many unit zones as there are non-zero tone values. The method comprises steps consisting in analyzing the digitized image in analysis windows and in converting the tone value in compliance with predetermined distribution and filling order of unit zones that takes account of the printing technique used for reproducing the half-tone image on a medium.

22 Claims, 40 Drawing Sheets

|  |  |  |  |  |
|---|---|---|---|---|
| 25 | 21 | 11 | 17 | 23 |
| 14 | 8 | 4 | 6 | 19 |
| 10 | 3 | 1 | 2 | 12 |
| 18 | 7 | 5 | 9 | 15 |
| 22 | 16 | 13 | 20 | 24 |

| | | | | | |
|---|---|---|---|---|---|
| 7 | 7 | 7 | 7 | 7 | 7 |
| 6 | 6 | 6 | 6 | 6 | 6 |
| 5 | 5 | 5 | 5 | 5 | 5 |
| 4 | 4 | 4 | 4 | 4 | 4 |
| 3 | 3 | 3 | 3 | 3 | 3 |
| 2 | 2 | 2 | 2 | 2 | 2 |
| 1 | 1 | 1 | 1 | 1 | 1 |

Figures 22, 23, 24, 25, 26, 27, 28, 29, 30, 31, 32, 33, 34, 35, 36, 37:
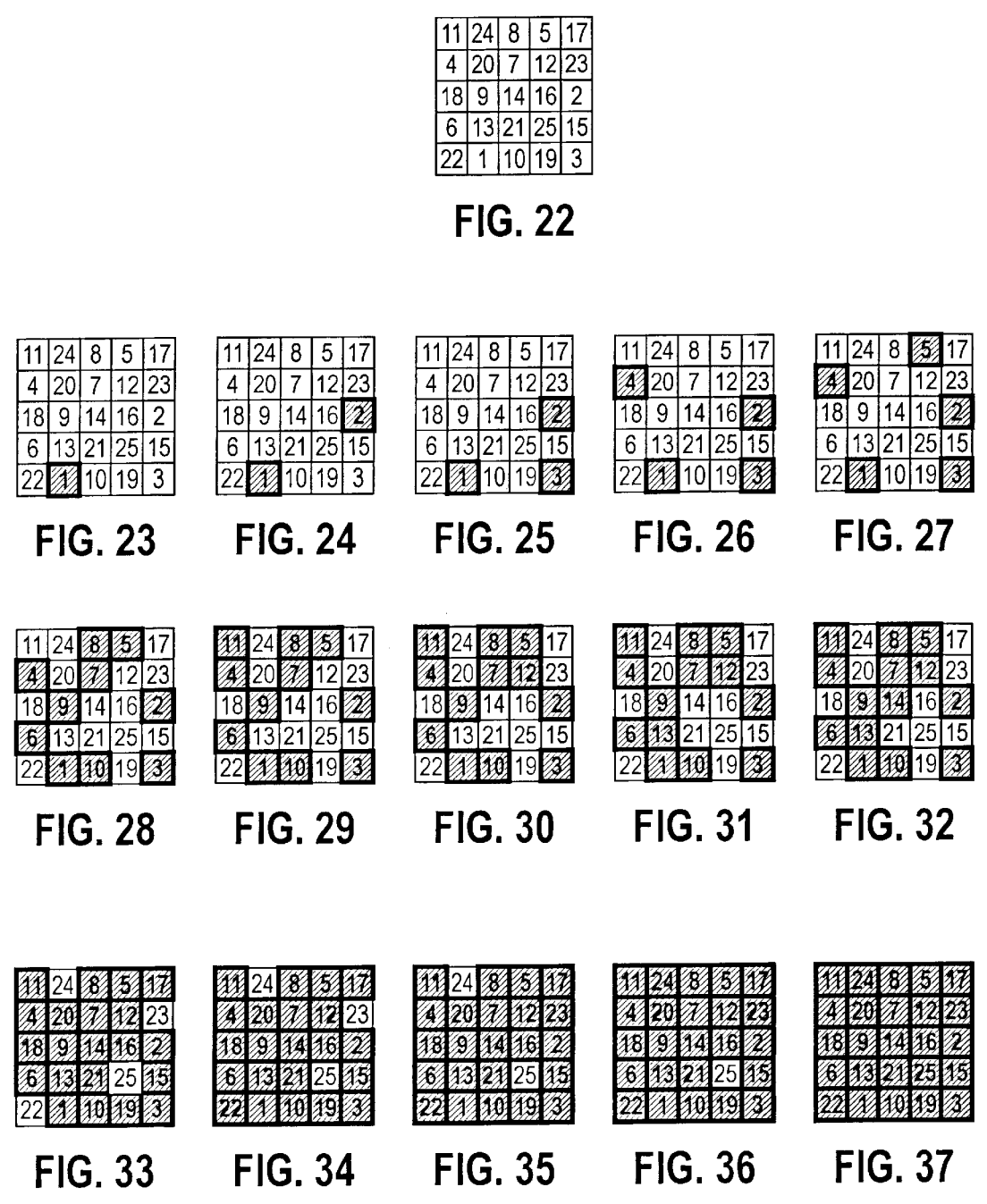

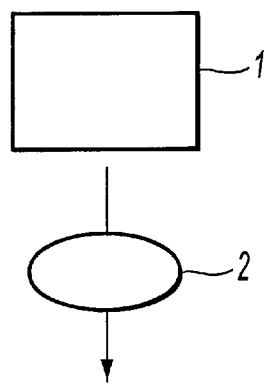
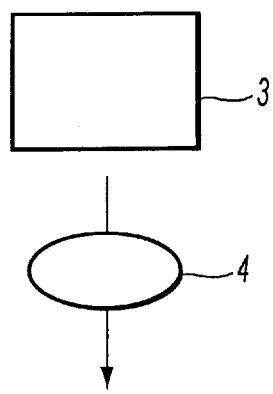
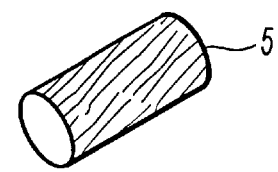
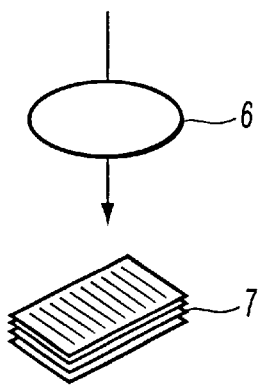
FIG. 40

| 25 | 21 | 11 | 17 | 23 | 25 | 21 | 11 | 17 | 23 |
|---|---|---|---|---|---|---|---|---|---|
| 14 | 8 | 7 | 7 | 19 | 14 | 4 | 3 | 3 | 19 |
| 10 | 8 | 7 | 7 | 12 | 10 | 4 | 3 | 3 | 12 |
| 18 | 9 | 8 | 8 | 15 | 18 | 9 | 4 | 4 | 15 |
| 22 | 16 | 13 | 20 | 24 | 22 | 16 | 13 | 20 | 24 |
| 25 | 21 | 11 | 17 | 23 | 25 | 21 | 11 | 17 | 23 |
| 14 | 2 | 1 | 1 | 19 | 14 | 6 | 5 | 5 | 19 |
| 10 | 2 | 1 | 1 | 12 | 10 | 6 | 5 | 5 | 12 |
| 18 | 9 | 2 | 2 | 15 | 18 | 9 | 6 | 6 | 15 |
| 22 | 16 | 13 | 20 | 24 | 22 | 16 | 13 | 20 | 24 |

FIG. 52

| 25 | 21 | 11 | 17 | 23 | 25 | 21 | 11 | 17 | 23 |
|----|----|----|----|----|----|----|----|----|----|
| 14 | 8  | 7  | 7  | 19 | 14 | 4  | 3  | 3  | 19 |
| 10 | 8  | 7  | 7  | 12 | 10 | 4  | 3  | 3  | 12 |
| 18 | 9  | 8  | 8  | 15 | 18 | 9  | 4  | 4  | 15 |
| 22 | 16 | 13 | 20 | 24 | 22 | 16 | 13 | 20 | 24 |
| 25 | 21 | 11 | 17 | 23 | 25 | 21 | 11 | 17 | 23 |
| 14 | 2  | 1  | 1  | 19 | 14 | 6  | 5  | 5  | 19 |
| 10 | 2  | 1  | 1  | 12 | 10 | 6  | 5  | 5  | 12 |
| 18 | 9  | 2  | 2  | 15 | 18 | 9  | 6  | 6  | 15 |
| 22 | 16 | 13 | 20 | 24 | 22 | 16 | 13 | 20 | 24 |

| 25 | 21 | 11 | 17 | 23 | 25 | 21 | 11 | 17 | 23 |
|----|----|----|----|----|----|----|----|----|----|
| 14 | 8  | 7  | 7  | 19 | 14 | 4  | 3  | 3  | 19 |
| 10 | 8  | 7  | 7  | 12 | 10 | 4  | 3  | 3  | 12 |
| 18 | 9  | 8  | 8  | 15 | 18 | 9  | 4  | 4  | 15 |
| 22 | 16 | 13 | 20 | 24 | 22 | 16 | 13 | 20 | 24 |
| 25 | 21 | 11 | 17 | 23 | 25 | 21 | 11 | 17 | 23 |
| 14 | 2  | 1  | 1  | 19 | 14 | 6  | 5  | 5  | 19 |
| 10 | 2  | 1  | 1  | 12 | 10 | 6  | 5  | 5  | 12 |
| 18 | 9  | 2  | 2  | 15 | 18 | 9  | 6  | 6  | 15 |
| 22 | 16 | 13 | 20 | 24 | 22 | 16 | 13 | 20 | 24 |

| 18 | 11 | 16 | 6 | 25 | 5 | 7 | 20 | 18 | 14 |
|---|---|---|---|---|---|---|---|---|---|
| 20 | 19 | 9 | 22 | 21 | 6 | 19 | 22 | 17 | 11 |
| 3 | 3 | 8 | 15 | 12 | 24 | 15 | 23 | 10 | 13 |
| 3 | 3 | 5 | 14 | 17 | 16 | 25 | 8 | 1 | 1 |
| 7 | 13 | 24 | 10 | 23 | 12 | 9 | 21 | 1 | 1 |
| 13 | 2 | 2 | 18 | 21 | 7 | 18 | 5 | 9 | 20 |
| 8 | 2 | 2 | 24 | 12 | 15 | 21 | 14 | 6 | 24 |
| 10 | 16 | 19 | 11 | 14 | 12 | 22 | 11 | 16 | 8 |
| 20 | 25 | 6 | 17 | 5 | 19 | 4 | 4 | 17 | 25 |
| 9 | 23 | 15 | 7 | 22 | 13 | 4 | 4 | 10 | 23 |

METHODS OF CONVERTING AND REPRODUCING AN IMAGE, AN INK TRANSFER MEMBER, AND A MEDIUM INCLUDING SUCH AN IMAGE

The present invention relates to reproducing a digitized image, particularly but not exclusively by means of a printing technique that makes use of an ink transfer member on which the image has been converted into a half-tone image.

BACKGROUND OF THE INVENTION

In such an image, also known as a screened image, the tones of the pixels in the digitized image are converted into selected ratios of inked area to non-inked area.

In the printing method using a screen with amplitude modulation, the tone values of the pixels in the digitized image are converted into selected ratios of inked area to non-inked area by modulating the size of each point in the screen as a function of the value of the tone to be reproduced.

FIGS. 1 to 16 show this principle, it being assumed for reasons of clarity of explanation that the tone of each pixel in the digitized image is encoded on 26 values only.

On this assumption, the area allocated in the half-tone image for reproducing each pixel of the digitized image, also referred to as a "base cell", is subdivided into 25 identical unit zones as shown in FIG. 1, and the same applies to the ink transfer member used for printing the medium, and to the medium printed in this way.

As a function of the tone to be reproduced, the screen dot fills a larger or smaller number of unit zones, with filling beginning in the center when an amplitude modulated screen is used, as shown in FIGS. 2 to 16.

In these figures, each unit zone is given a number that corresponds to the tone value above which that zone is to be covered in ink.

FIGS. 2 to 6 show respectively the unit zones which are inked to reproduce tone values going from 1 to 5, FIGS. 7 to 11 respectively represent those which are inked to represent tone values going from 11 to 15, and FIGS. 12 to 16 show the zones which are inked respectively for representing tone values going from 21 to 25.

FIG. 17 shows the tone values of the pixels in a digitized image that is to be reproduced, corresponding to toning varying from high light level near the bottom (i.e. small tone values) towards low light levels near the top (i.e. higher tone values).

Assuming that the printing technique used for printing the image shown in FIG. 17 has no physical limitations, then the distribution of inked areas both on the ink transfer member and on the printed medium will be as shown in FIG. 18.

Unfortunately, in practice, it turns out that known printing techniques do not enable dark and/or light tones to be reproduced faithfully, particularly because of physical limitations.

In particular, if the printing technique used is flexographic printing, i.e. if it implements an ink transfer member which is etched so as to have relief at those locations where ink is to be transferred onto the medium that is to be printed, it is observed that isolated portions of relief of small size that are intended to reproduce pale tones cannot be achieved or cannot be retained durably because they are too fragile.

The same problem arises with dry offset printing.

To illustrate the above, it can be assumed that portions of relief of a size corresponding to less than four unit zones in FIG. 18 cannot be made physically on the ink transfer member, such that the image as actually printed on the medium will be as shown in FIG. 19.

To illustrate the consequences on the visual appearance of the printed image of failure to reproduce pale tones, it is appropriate to compare FIGS. 20 and 21.

FIG. 20 shows an image that reproduces all of the tones, from the palest values to the darkest values.

In FIG. 21, the same image is shown, but with no toning when the value of the toning is less than a given threshold, which threshold depends in practice on physical limitations specific to the printing technique used.

Problems also arise in reproducing dark tones, particularly when the printing technique used is flexographic printing or dry offset printing, since although the strength of the portions in relief formed on the ink transfer member is no longer an issue, there is then a tendency for isolated unit zones that are not inked to become plugged because of the phenomenon of ink accretion during printing.

This means that it is not possible to reproduce dark tones on the printed medium.

Furthermore, in the printing method that uses a so-called "random" screen, conversion of each tone value into a selected ratio of inked area to non-inked area in the base cell is performed by filling unit zones, not starting from the center, but in a random or pseudo-random manner so that the inked unit zones are distributed over the entire area of the base cell, as shown in FIGS. 22 to 37.

In FIG. 22, the unit zones are numbered in the order in which they are successively covered with ink as the value of the tone to be reproduced increases.

Thus, FIGS. 23 to 27 show the unit zones that are inked to represent tone values 1 to 5, respectively, FIGS. 28 to 32 show the zones which are inked to present tone values 10 to 14, respectively, and FIGS. 33 to 37 represent the zones which are inked to represent tone values of 21 to 25, respectively.

When the image to be reproduced has tonings with tone values that increase when going upwards, as shown in FIG. 17, then, for a printing technique that suffers from no physical limitation, the inked area distribution shown in FIG. 38 would be obtained on the inking transfer member and on the printed medium.

However, the reproduction of pale tones suffers from the physical limitations of the printing technique used, such that in fact it is not possible to reproduce in satisfactory manner on the printed medium all of the tones in the digitized image.

Proposals have been made to remedy the problem of reproducing pale tones by printing the zones of the image concerned by this problem with a screen at half the pitch so as to benefit from bigger screen points.

Nevertheless, the transition between zones using screens of different pitches can clearly be seen on the image that is obtained in this way, and that is undesirable.

One such image is shown in FIG. 39.

In general, whatever the printing technique used, e.g. wet offset, dry offset, gravure, silk screen, rubber stamping, flexographic printing, or indeed ink jet printing, the reproduction of tones that are pale and/or dark gives rise to problems, whether for reasons of mechanical strength concerning portions in relief or plugging while printing is taking place, or for other reasons such as the diffraction of light by the photographic film used for photoengraving or for photosensitizing the ink transfer member, or indeed because of phenomena associated with ink accretion, drying, surface tension, etc.

European patent application EP-A-0 740 457 discloses a method in which a changeover is made from amplitude modulation to frequency modulation for pale tones. That method makes it possible to avoid problems associated with reproducing points in pale areas that are encountered with amplitude modulation. Nevertheless, that method does not always provide results that are visually satisfactory since the eye tends to perceive the zone of the image which is screened using frequency modulation as suffering from a defect since the spacing between the points appears irregular compared with the remainder of the image which is screened using amplitude modulation.

OBJECTS AND SUMMARY OF THE INVENTION

The present invention seeks to improve reproduction of pale and/or dark tones, whatever the printing technique used.

In particular, the invention provides a conversion method for generating a half-tone image from a digitized image comprising a set of pixels each having a tone value, with each pixel of the digitized image being associated with a base cell of the half-tone image being subdivided into as many unit zones as there are non-zero tone values, the method comprising the steps consisting in:

analyzing the digitized image in terms of analysis windows each constituted by grouping together a predetermined number of pixels; and at least when the tone value of at least one of the pixels in an analysis window falls within a first predetermined set of tone values, converting the tone value of each of the pixels of the analysis window into respective selected ratios of inked area to non-inked area in the various base cells corresponding respectively to said pixels, said base cells together forming a supercell, said conversion being performed by complying with a predetermined distribution and filling order of unit zones that is a function of the tone value to be converted, said distribution and said filling order taking account of the printing technique used for reproducing the half-tone image on a medium, the resulting image having two zones with different screen pitches without any sharp transition therebetween.

In a particular implementation, conversion to respective selected ratios of inked area to non-inked area in the various base cells of the supercell is performed by complying with a predetermined distribution and filling order for unit zones that is a function of the tone value to be converted, and doing so regardless of the individual tone values of the pixels in the analysis window.

Still in a particular implementation, when all of the tone values of the pixels in the analysis window fall within a second predetermined set of tone values, the unit zones of all of the base cells of the supercell are filled in the same manner.

Advantageously, the predetermined distribution and filling order serve to group together filled unit zones within the supercell when the tone value of at least one of the pixels of the analysis window is below a given threshold.

Preferably, the filled unit zones are grouped together in slabs of n unit zones within each base cell belonging to the supercell, n being a multiple of the number of base cells constituting the supercell.

Advantageously, the predetermined distribution and filling order serve to group together empty unit zones within the supercell when the tone value of at least one of the pixels of the analysis window is greater than a given threshold.

Preferably, the empty unit cells are grouped together in slabs of n unit zones within each base cell belonging to the supercell where n is a multiple of the number of base cells constituting the supercell.

Each slab may be positioned in the center of the base cell in which it is to be found.

In a variant, each slab may be positioned off-center within the base cell in which it is to be found.

The invention also provides a method of reproducing a digitized image by a printing technique such as wet offset, dry offset, gravure, silk screen printing, rubber stamping, or flexographic printing, implementing an ink transfer member on which the tones of the pixels of the image to be reproduced are converted into selected ratios of inked areas to non-inked areas by the above-specified conversion method.

By means of the method, it is possible to reproduce various tones that are pale and/or dark more faithfully in spite of the limitations of the printing technique used.

In the invention, dots are built up within each supercell by using predetermined geometry, and not in random manner. In other words, dots are constructed for pale and/or dark tones without using frequency modulation, but by using predetermined filling and distribution orders enabling the unit zones inked in pale tones and/or the empty zones in dark tones to be grouped together, thereby obtaining two zones of different screen pitch without any sudden transition between them.

The invention makes it possible in particular to reproduce variations in toning within pale tones because the unit zones that are inked are no longer isolated.

Thus, when the printing technique is dry offset printing or flexographic printing that implements portions in relief on the ink transfer member, the fragility of said portions in relief is reduced because they are of larger size since they are organized to reproduce slabs made up of a plurality of unit zones, and not unit zones that are isolated.

Similarly, regardless of whether the printing technique is gravure and implements recesses in the ink transfer member, silk screen printing implementing openings in the ink transfer member, or indeed wet offset printing implementing repulsion between oil and water on the ink transfer member, the invention makes it possible, by grouping together the inked unit zones that are to reproduce pale tones or the uninked zones that are to reproduce dark tones, to avoid being confronted with the above-mentioned problems associated with said unit zones being isolated.

In addition, with photoengraving or photo-sensitization of the ink transfer member, light diffraction phenomena are reduced because the unit zones that have been grouped together in this way diffract light to a lesser extent than do isolated unit zones.

The invention also provides a method of reproducing a digitized image by an ink jet printing technique, wherein a half-tone is printed as obtained by the above-specified conversion method.

Under these circumstances, a half-tone image is reproduced more faithfully when the toning is dark, since the distortions due to the phenomenon of accretion are reduced.

The invention also provides an ink transfer member comprising a zone for reproducing various pale tones, wherein said zone has a plurality of inked areas of identical dimensions and non-inked areas of dimensions greater than or equal to those of a base cell.

The invention also provides an ink transfer member comprising a zone for reproducing various dark tones, wherein said zone has a plurality of non-inked areas of identical dimensions and inked areas of dimensions that are greater than or equal to those of a base cell.

The invention also provides a printed medium comprising a zone reproducing various pale tones, wherein said zone has a plurality of inked areas of identical dimensions and non-inked areas of dimensions greater than or equal to those of a base cell.

The invention also provides a printed medium comprising a zone reproducing various dark tones, wherein said zone presents a plurality of non-inked areas of identical dimensions and inked areas of dimensions greater than or equal to those of a base cell.

The invention also provides a medium obtained by implementing the above-specified method.

BRIEF DESCRIPTION OF THE DRAWINGS

The invention will be better understood on reading the following description of non-limiting implementations of the invention, and with reference to the accompanying drawings, in which:

FIGS. 1 to 39, described above, show the state of the art;

FIG. 40 is a diagram showing the various steps of a method of reproducing a digitized image in application of a particular implementation of the invention;

FIGS. 41 to 51 show a first implementation of the invention;

FIGS. 52 to 66 show a second implementation of the invention;

Figures 68, 69:
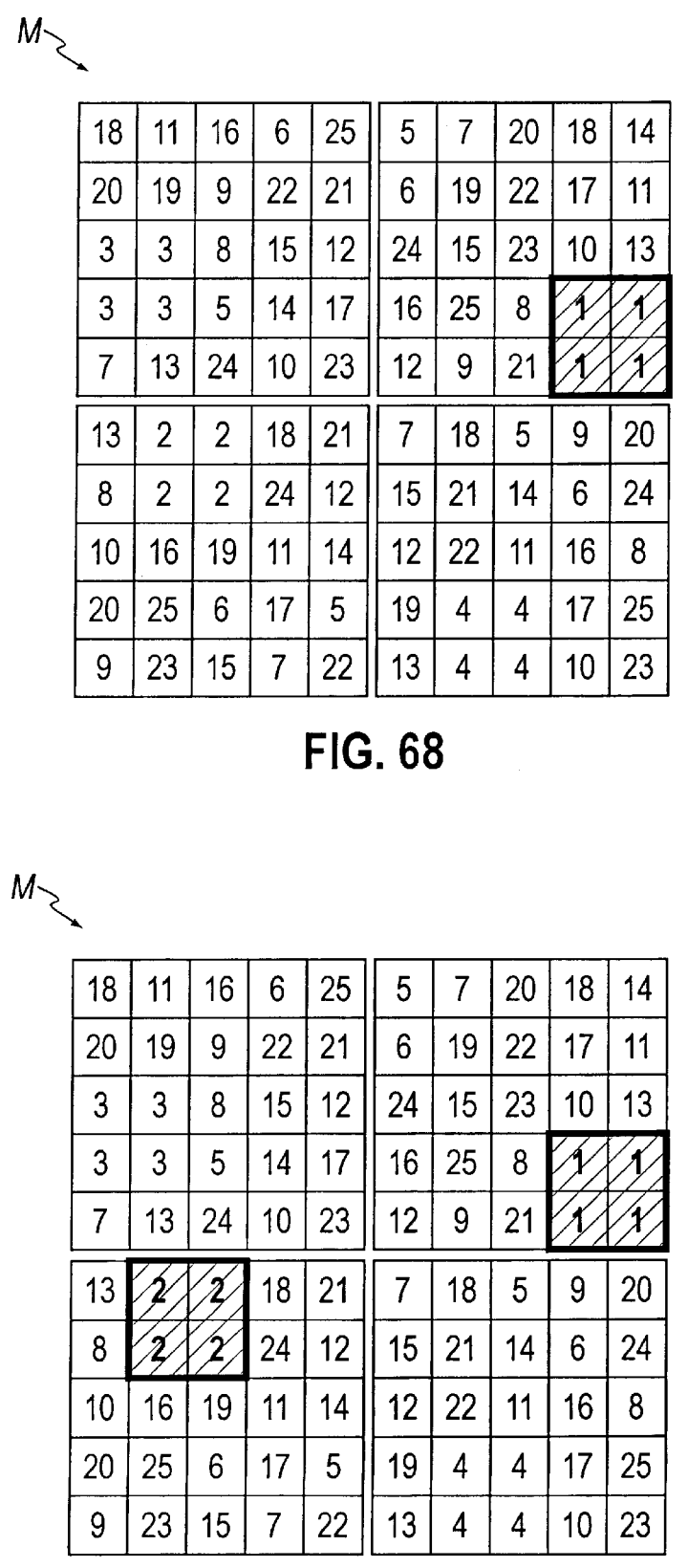
Figures 70, 71:
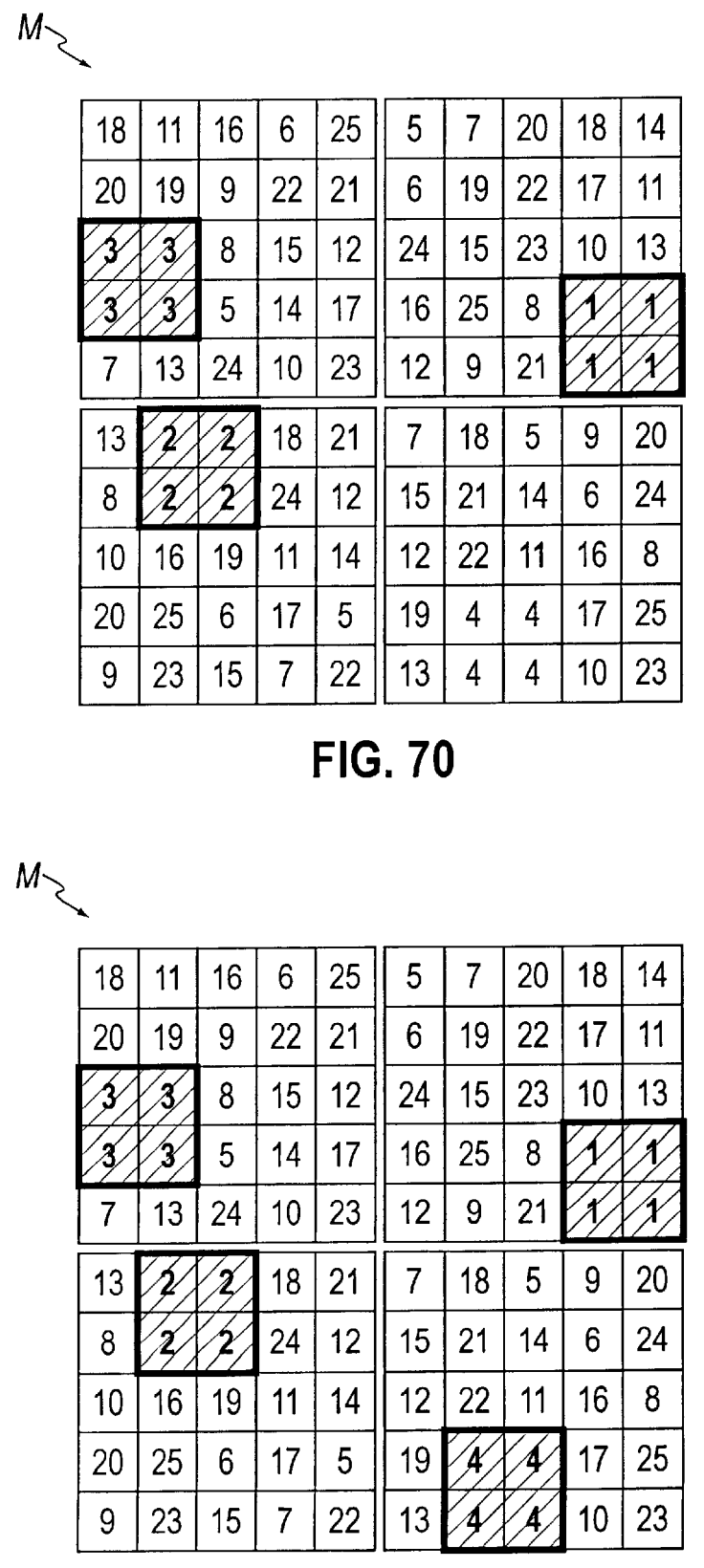
Figures 72, 73:
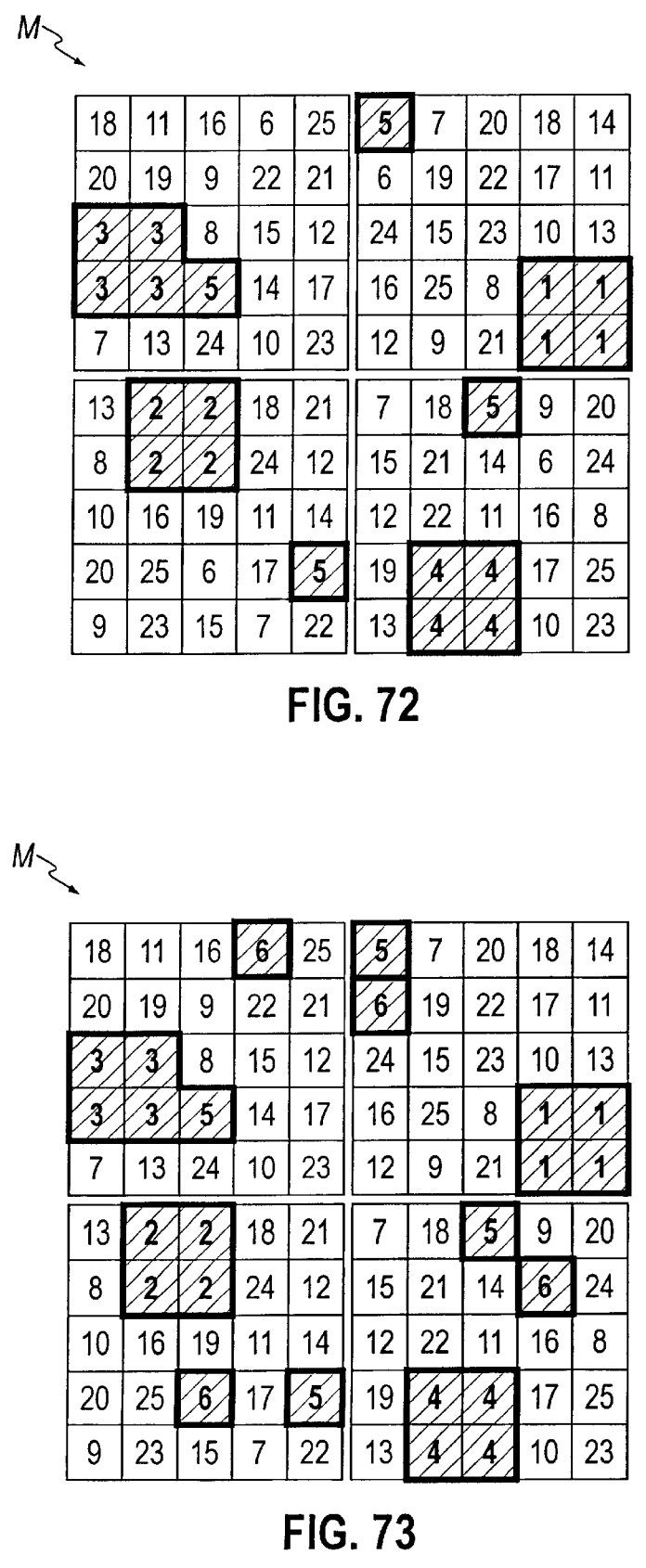

FIGS. 67 to 75 show a third implementation of the invention;

FIGS. 76 to 86 show a fourth implementation of the invention, and

MORE DETAILED DESCRIPTION

Figure 20:
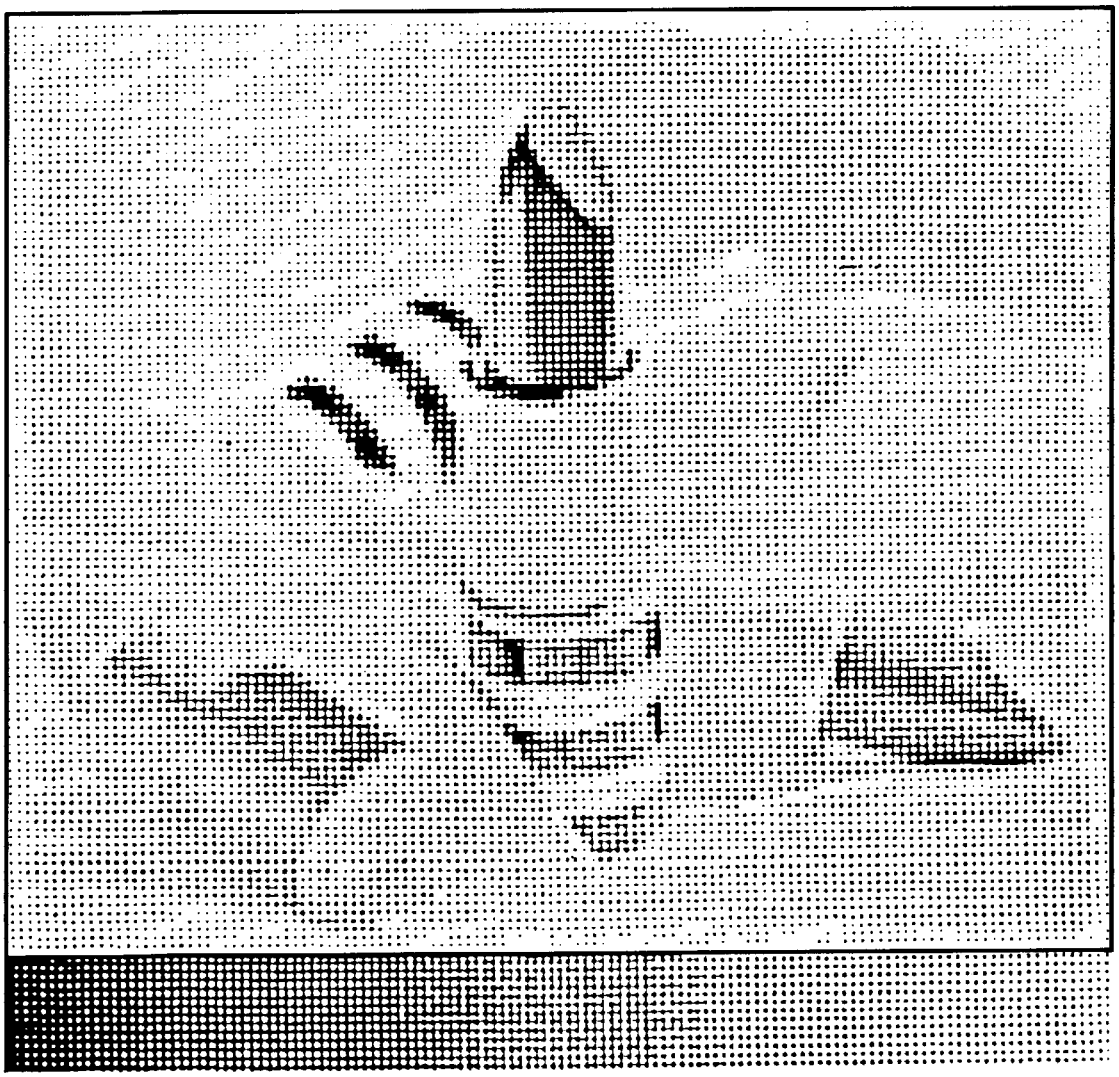
Figure 21:
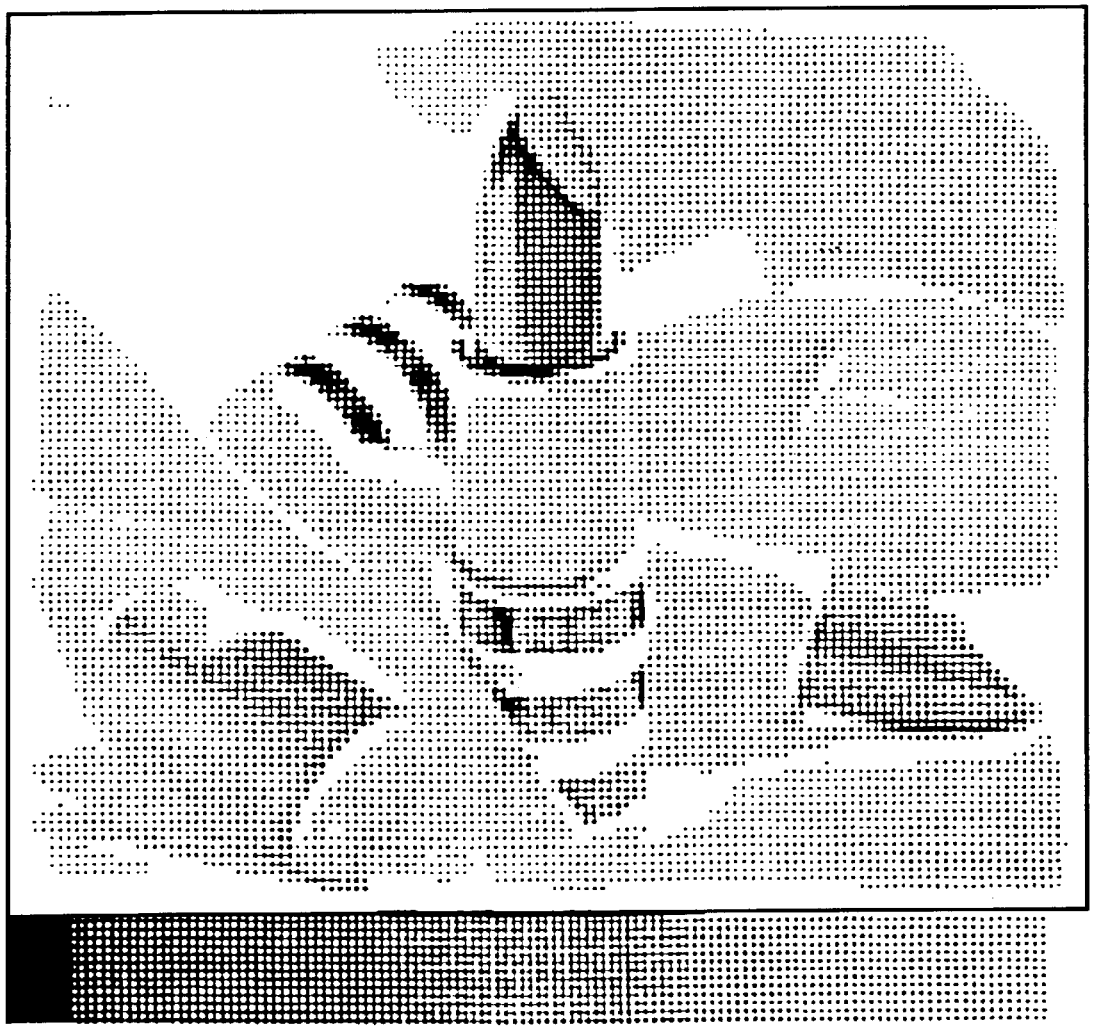
Figure 39:
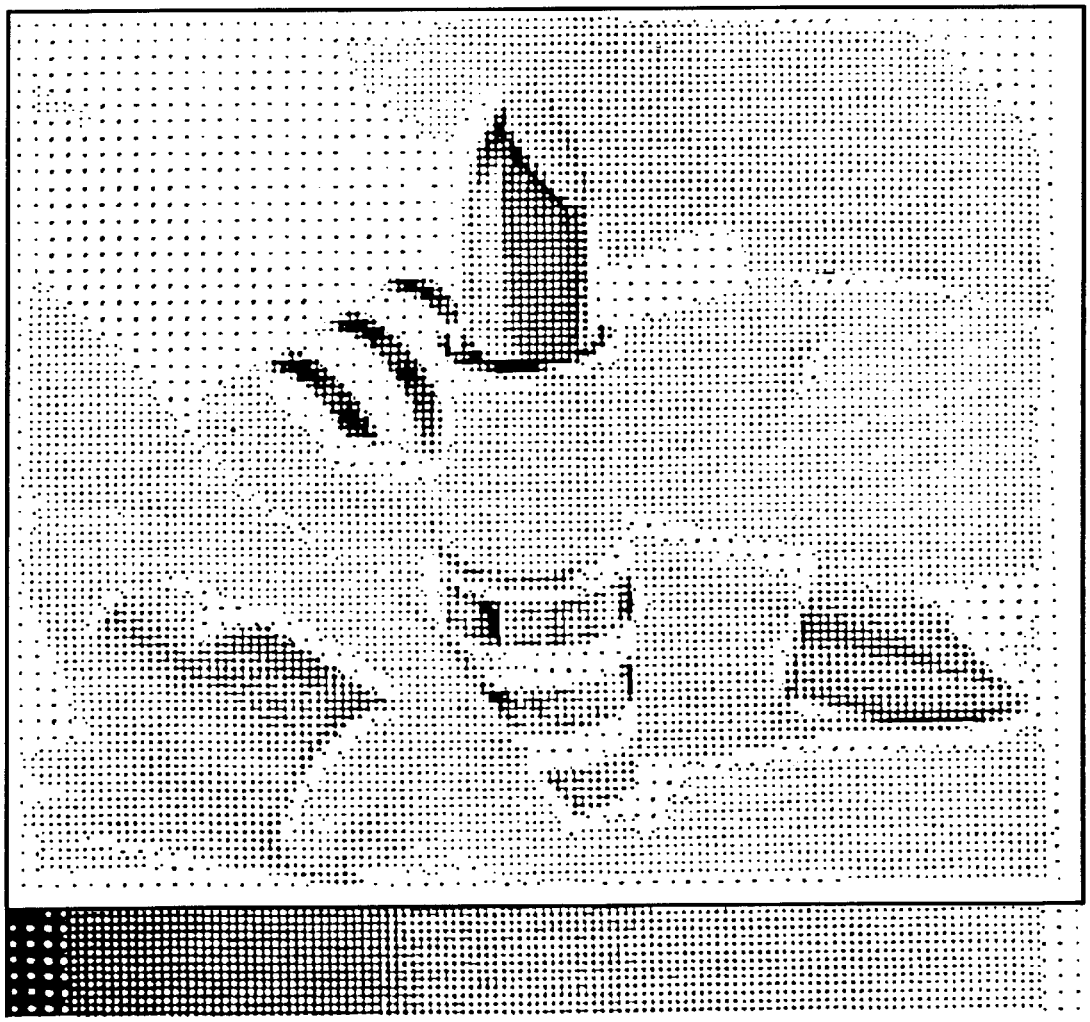

It is assumed below that the printing technique used is flexographic printing and it includes engraving an ink transfer member.

The source is a digitized image 1 in which the tone value for each pixel is encoded on $2^n$ bits, e.g. 8 bits, giving a total 256 possible values.

Using a conversion method that is described below, a first step 2 is performed in which a half-tone image is produced, which image is stored in a file 3.

Subsequently, in a following step 4, the file 3 is used to make a film that is used for photoengraving an ink transfer member 5.

On the ink transfer member 5, the tone values of the pixels in the digitized image are reproduced by selected ratios of inked areas to non-inked areas.

During the following step 6, the ink transfer member 5 is applied to a medium 7 that is to be printed in conventional manner.

With reference to FIGS. 41 to 51, there follows a description of how above-mentioned step 2 is implemented in a first implementation of the conversion method of the invention, more specifically for the purpose of improving reproduction of pale tones.

In order to simplify the explanation and the drawings, it is assumed below that the value of the tone of each pixel in the digitized image that is to be reproduced is encoded on 26 values only, over the range 0 to 25, it being understood that in practice the number of tone values is higher, e.q. being equal to 256.

Each pixel of the digitized image corresponds to a base cell of the half-tone image. The base cell is subdivided into 25 identical unit zones.

In the conversion method, the digitized image is initially decomposed into a set of analysis windows F, each constituted by a predetermined number of pixels in the horizontal direction and in the vertical direction, e.g. two-by-two pixels in the example under consideration.

Figure 48:
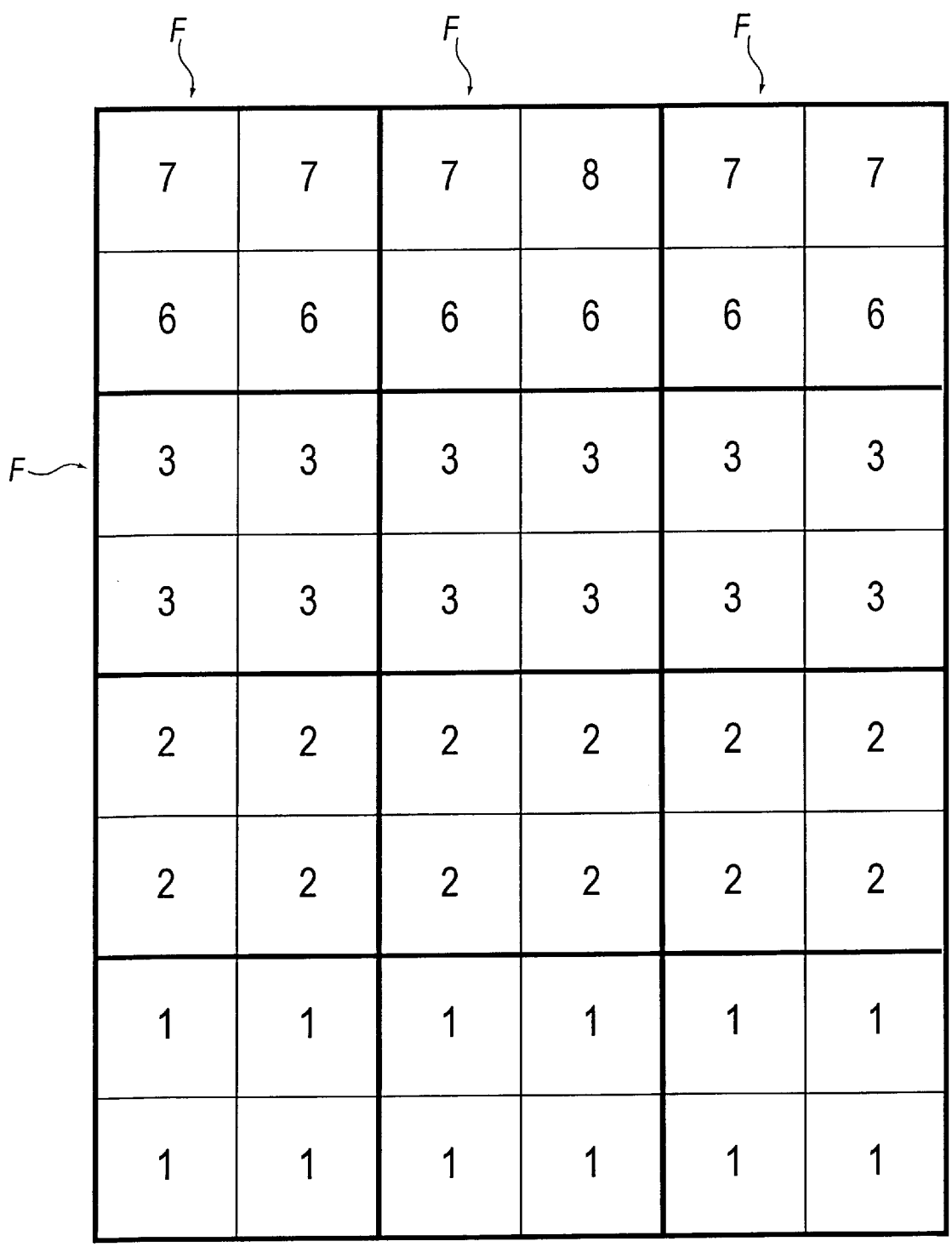

FIG. 48 shows a succession of such windows F in a digitized image.

Figures 41, 42:
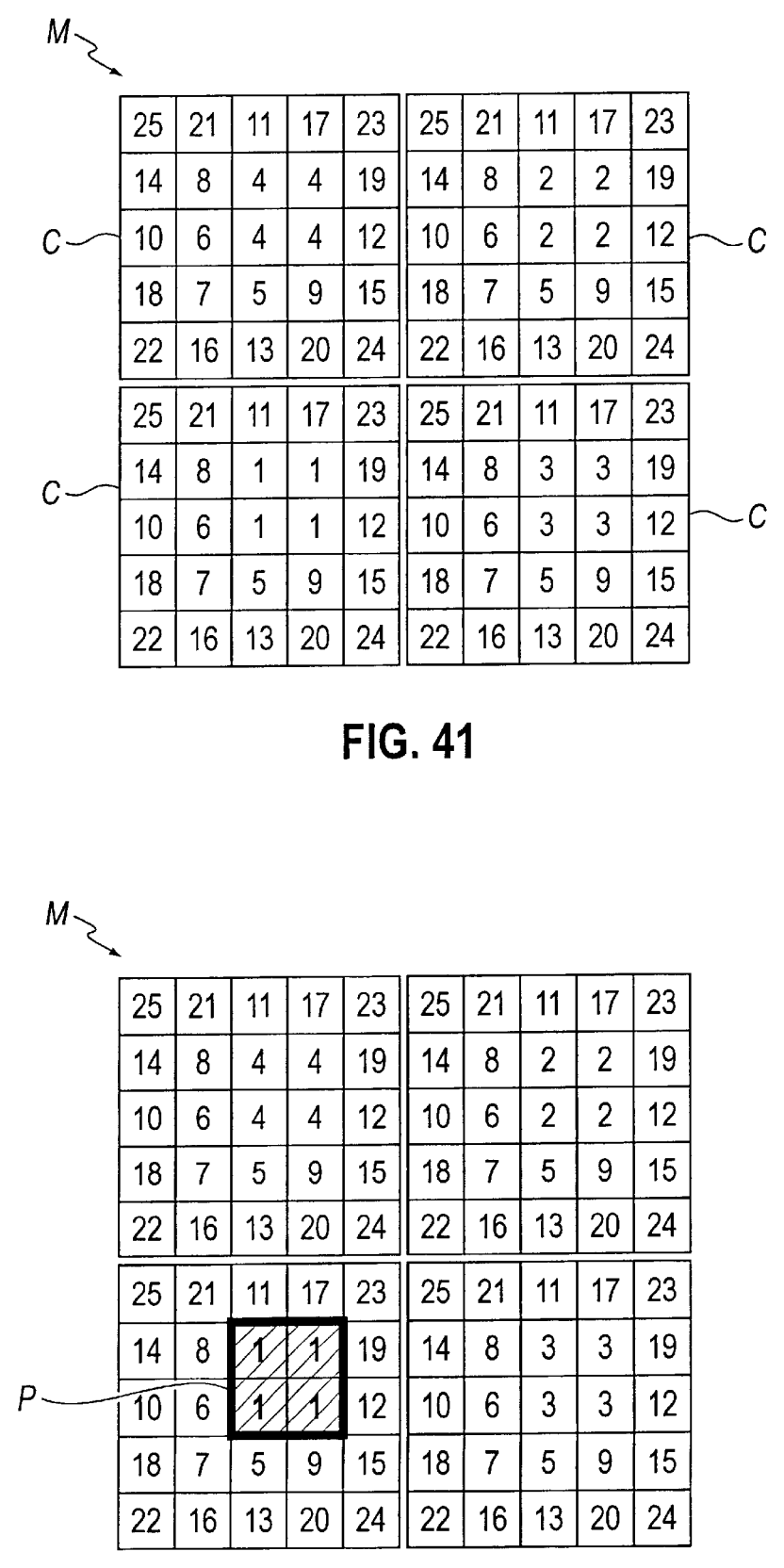

Each analysis window F is associated with a supercell M of the half-tone image, constituted by the same number of rows and columns of base cells as there are pixels in the horizontal and vertical directions respectively in the analysis window under consideration, in this case a group of two-by-two base cells C as shown in FIG. 41.

In this figure, numbers 1 to 25 are given to the unit zones in each of the base cells C in the order in which they are inked, as a function of the tone value to be reproduced.

FIGS. 42 to 45 show how the supercell M is progressively covered in ink when the tone values for all of the pixels in the analysis window are equal respectively to 1, 2, 3, and 4.

As can be seen, the supercell M is filled by slabs P each comprising four unit zones, such that there is never a single isolated inked unit zone.

The number of unit zones making up each slab P is selected so that the dimensions of the slab are greater than the minimum dimensions below which the physical limitations of the printing technique used are encountered.

When all of the pixels of the analysis window have a corresponding tone value greater than 4, then each of the corresponding base cells has at least four inked unit zones, and they are grouped together.

Above tone value 4, the order in which the unit zones are filled and the way in which they are distributed as a function of the tone values to be reproduced are the same for all of the base cells C constituting the supercell M.

In the example shown, the filling of the base cells takes place initially by filling the unit zones that are closest to the center, and this is done in the numbering order shown in FIGS. 41 to 47.

Figures 45, 46, 47:
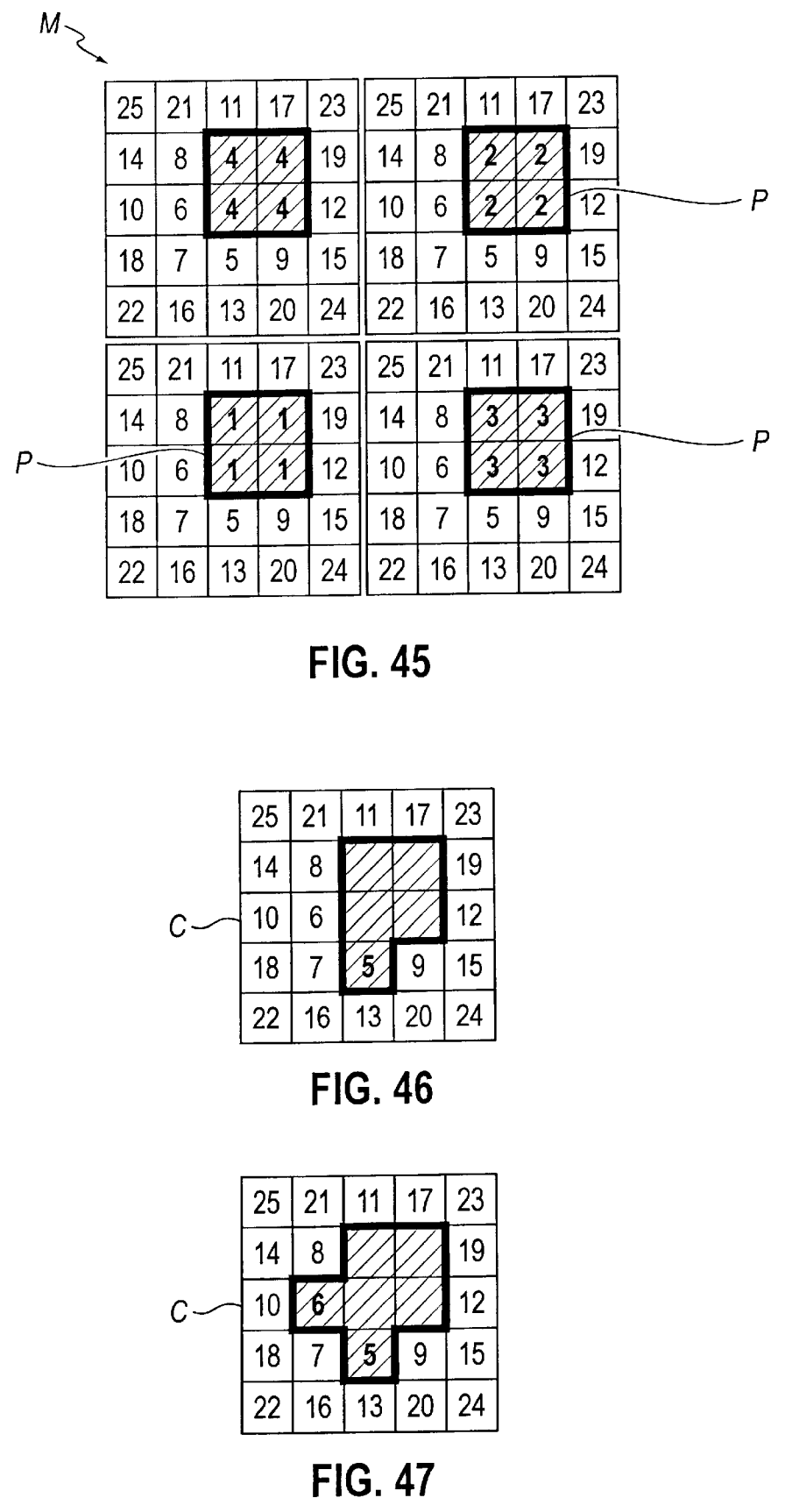

FIGS. 46 and 47 show two base cells having respective filling ratios of 5/25 and 6/25, corresponding to tone values of 5 and of 6.

Figure 49:
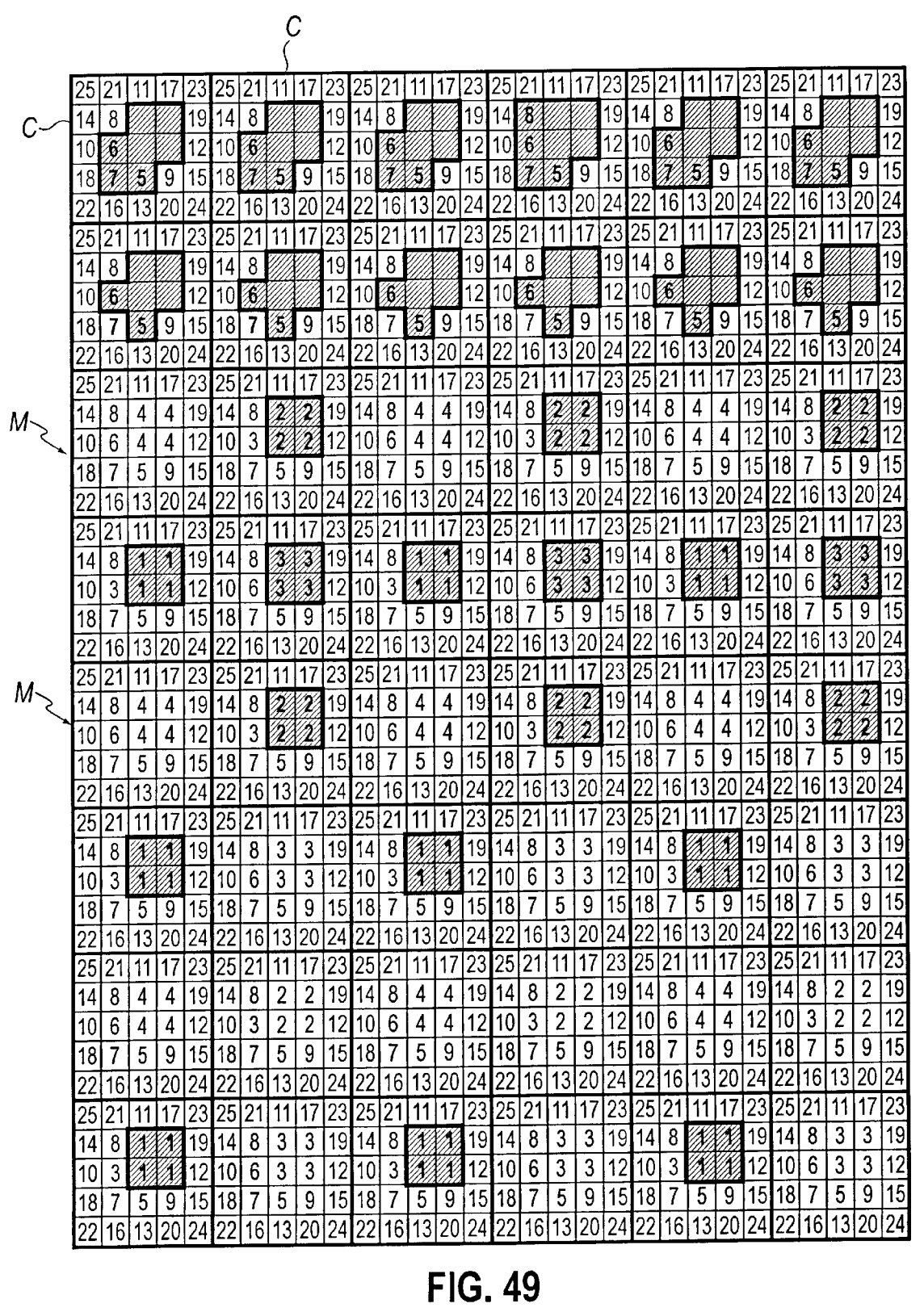

Assuming that the tone values of the pixels in the image to be reproduced are those given in FIG. 48, and applying the above-described conversion method, the distribution of inked areas that is obtained on the printed medium is as shown in FIG. 49.

It will be seen that in the pale zones, all of the inked areas are of the same dimensions since they are constituted by slabs P.

It will also be observed in this zone that there are base cells present that are not inked at all.

On examining FIG. 41, it will be seen that the top left base cell has no inked area so long as the tone value of the corresponding pixel of the analysis window is less than or equal to 3.

Similarly, the top right base cell in FIG. 41 has no inked area so long as the tone value of the corresponding pixel of the analysis window is less than or equal to 1.

The bottom right base cell in FIG. 41 has no inked area so long as the tone value of the corresponding pixel of the analysis window is less than or equal to 2.

Figure 50:
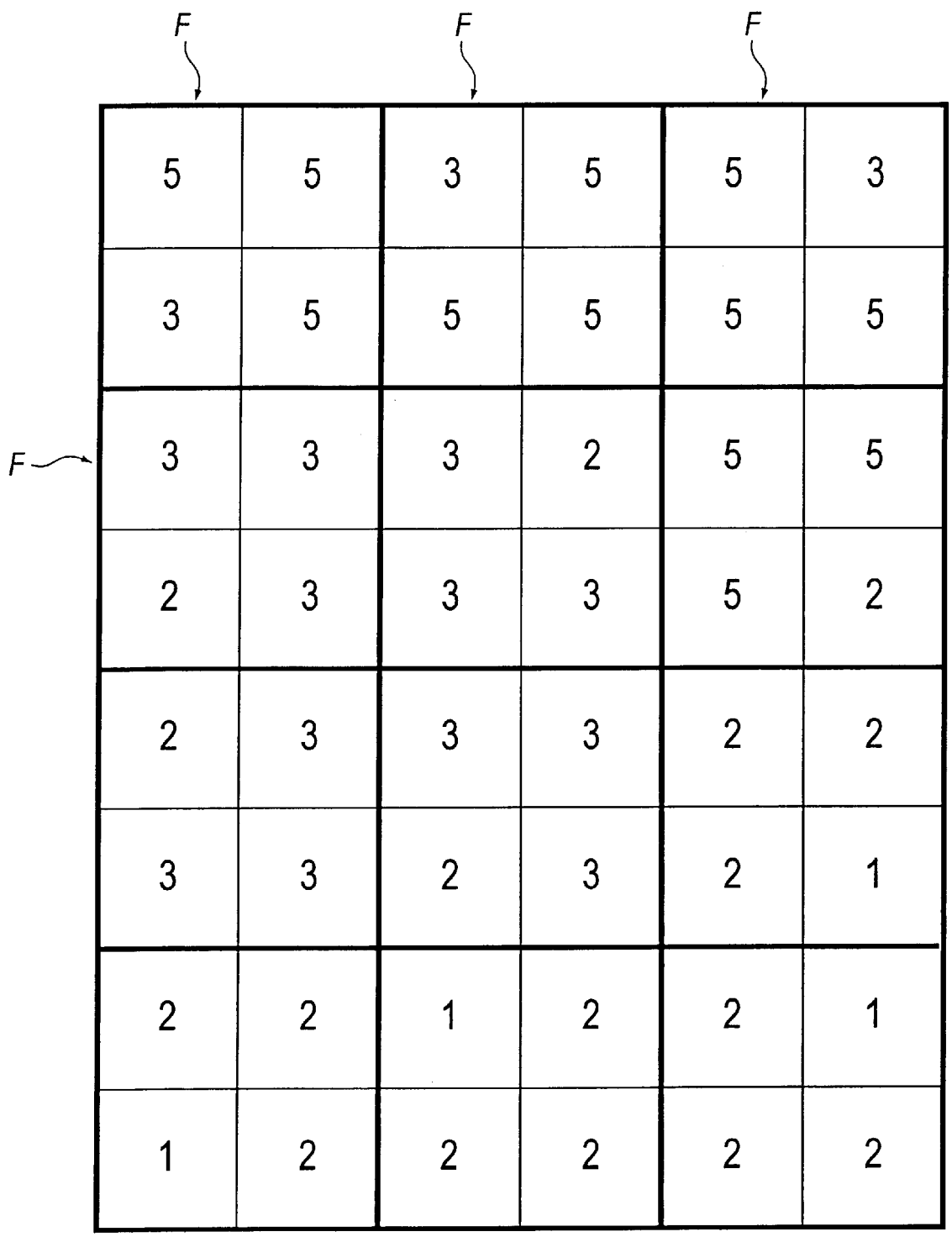
Figure 51:
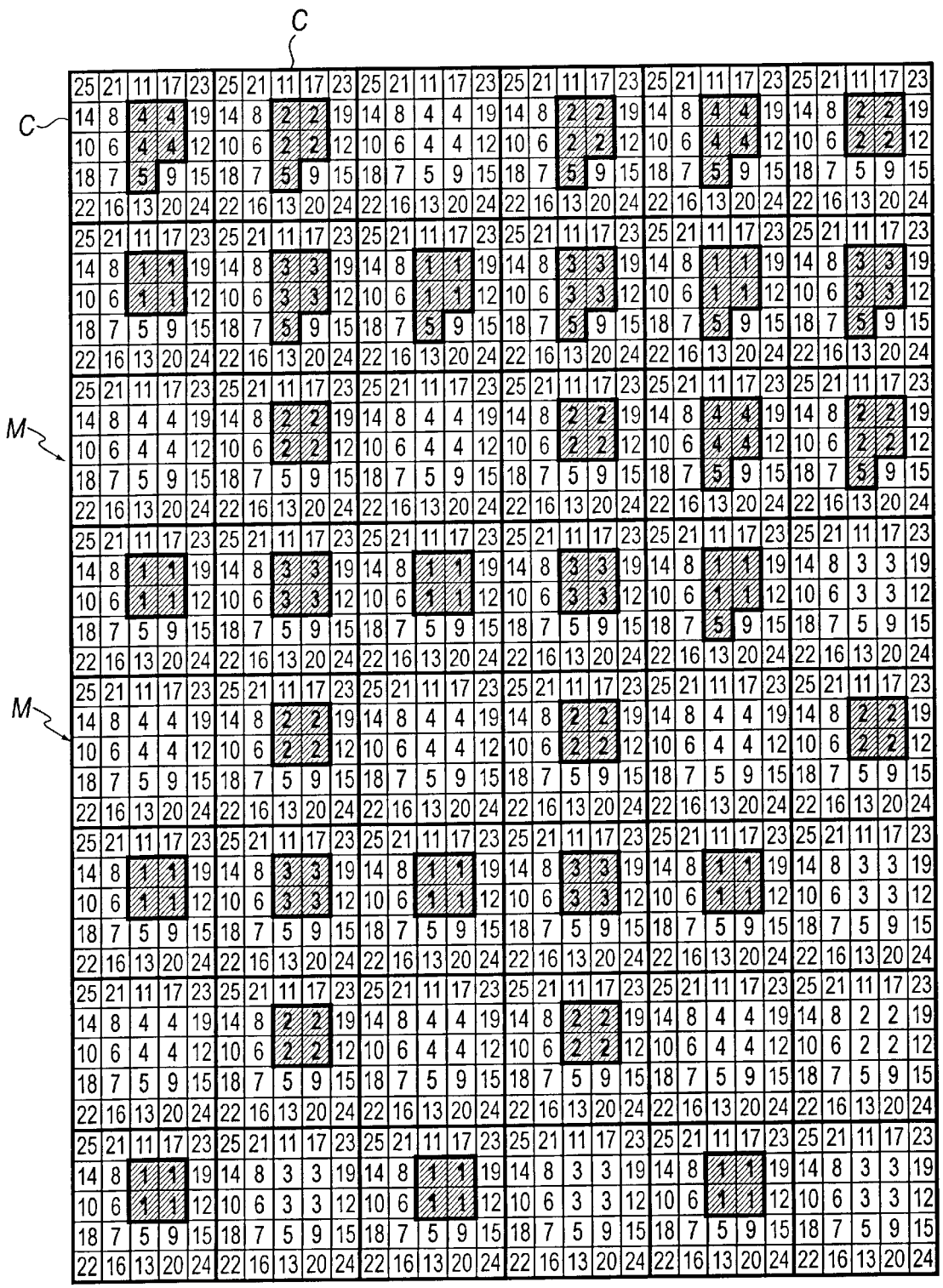

FIG. 50 shows another digitized image and FIG. 51 shows the half-tone image that is obtained by converting each analysis window into a supercell using the method as described above, i.e. by using the distribution and filling order for the unit zones in each of the supercells as given by FIG. 41.

It will be observed that a certain amount of information is lost during conversion of pale tones because not all of the pixels within each analysis window have the same value.

It will thus be understood that the conversion method of the invention gives better results when the variations in pixel tone values in the digitized image take place slowly.

Nevertheless, even with rapid variations, the half-tone image obtained by the conversion method of the invention remains contrasted, and it is found that the distortions generated by the invention are difficult or impossible for the naked eye to perceive.

Figure 87:
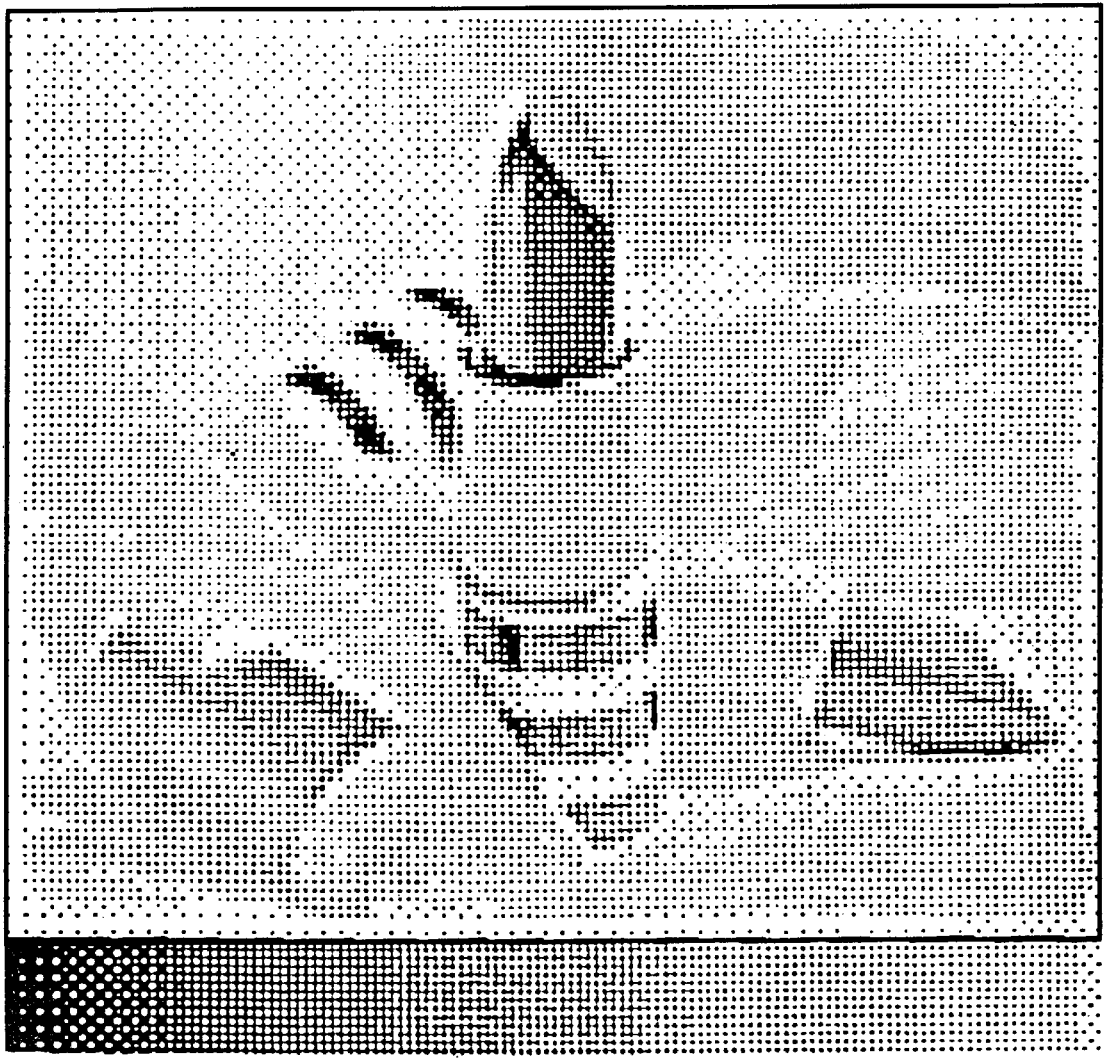
FIG. 87 shows the improvement in the reproduction of pale tones as provided by the invention.

FIG. 87 shows a half-tone image obtained using the conversion method of the invention.

It will be observed that in the pale zones, there is a change to a screen pitch having half as many lines per unit length without any sudden transition.

FIGS. 52 to 66 show another implementation of the invention.

This implementation differs from the preceding implementation in particular by the way in which the inked unit zones within the supercell M are grouped together in order to reproduce pale tones.

In addition, in this example, so long as the tone value of at least one of the pixels in the analysis window is less than or equal to 8 (and not merely 4 as above), the inked unit zones are distributed unequally between the various base cells making up the supercell M.

More particularly, the unit zones of the supercell M are filled using the distribution and filling order specified in FIG. 52.

When the tone value of all of the pixels making up the analysis window is equal to 1, this value is converted into an equivalent inked area within the supercell M by filling only a slab P of four unit zones in base cell C that is situated bottom left, as shown in FIG. 53.

Figures 55, 56:
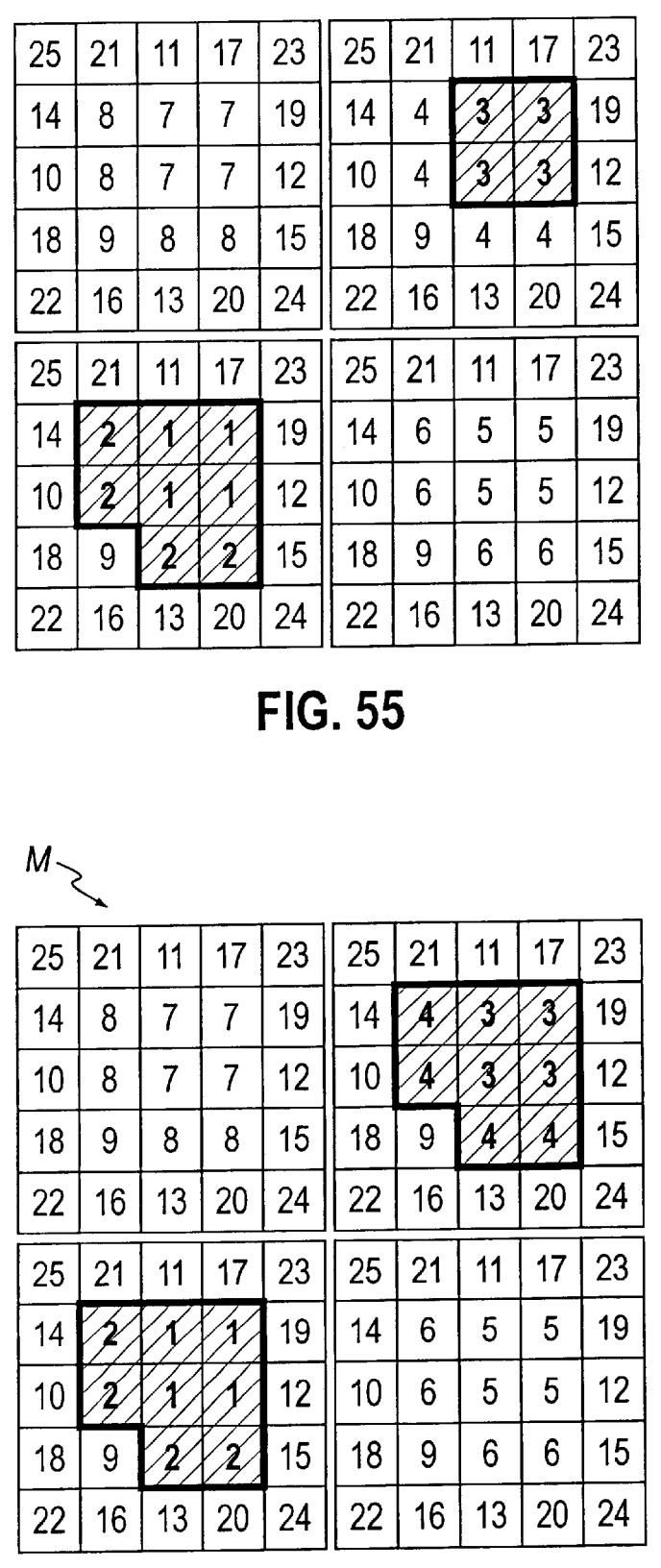
Figures 57, 58:
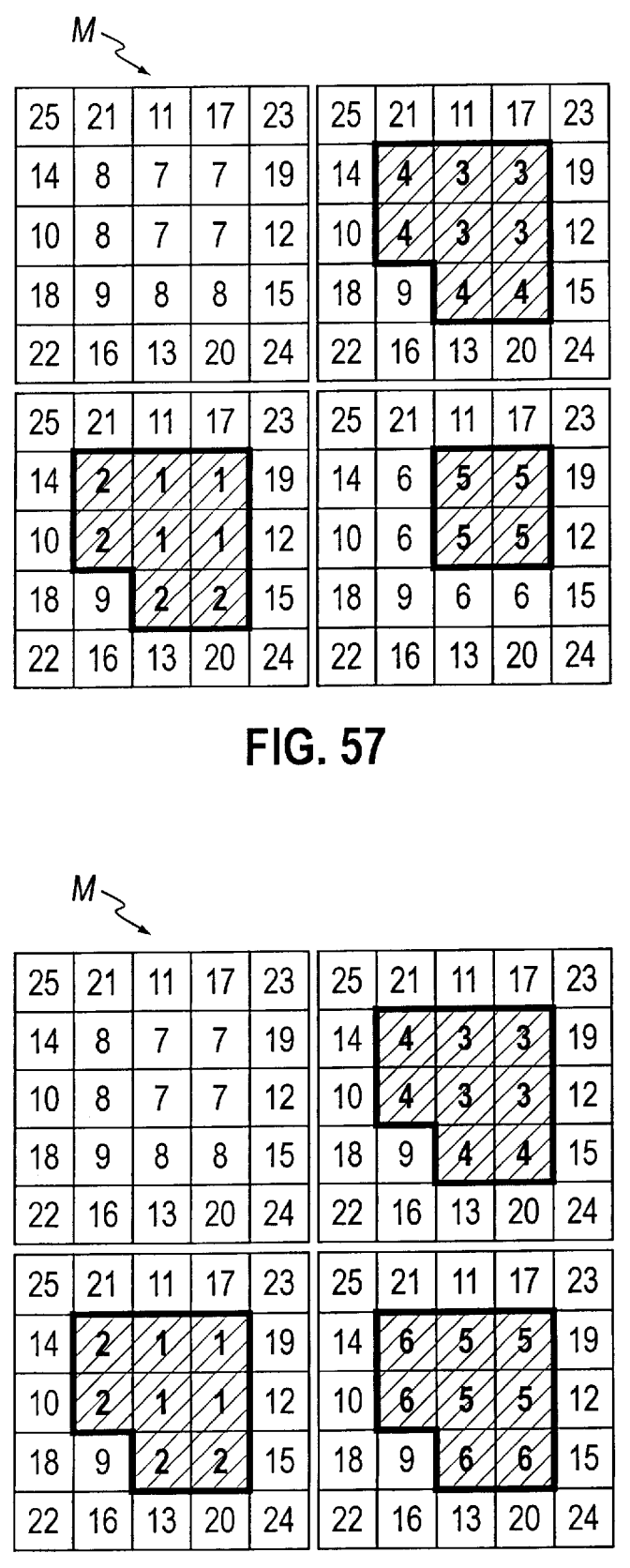

Similarly, when the tone value of all of the pixels in the analysis window is equal to 2, four additional unit zones adjacent to said slab are filled, as shown in FIG. 57, and when the tone value of all of the pixels in the analysis window is equal to 3, then a new slab P of four unit zones is filled in base cell C that is situated top riqht, as shown in FIG. 55.

FIGS. 56 to 60 show how filling of the supercell M is performed when all of the pixels in the analysis window have tone values equal to 4, 5, 6, 7, and 8, respectively.

When the tone values of all of the pixels in the analysis window are greater than 8, then filling is performed in each of the base cells C using the same distribution of inked unit zones as a function of the tone values to be reproduced, as shown in FIGS. 61 to 64 for tone values 9 to 12 respectively.

Figure 65:
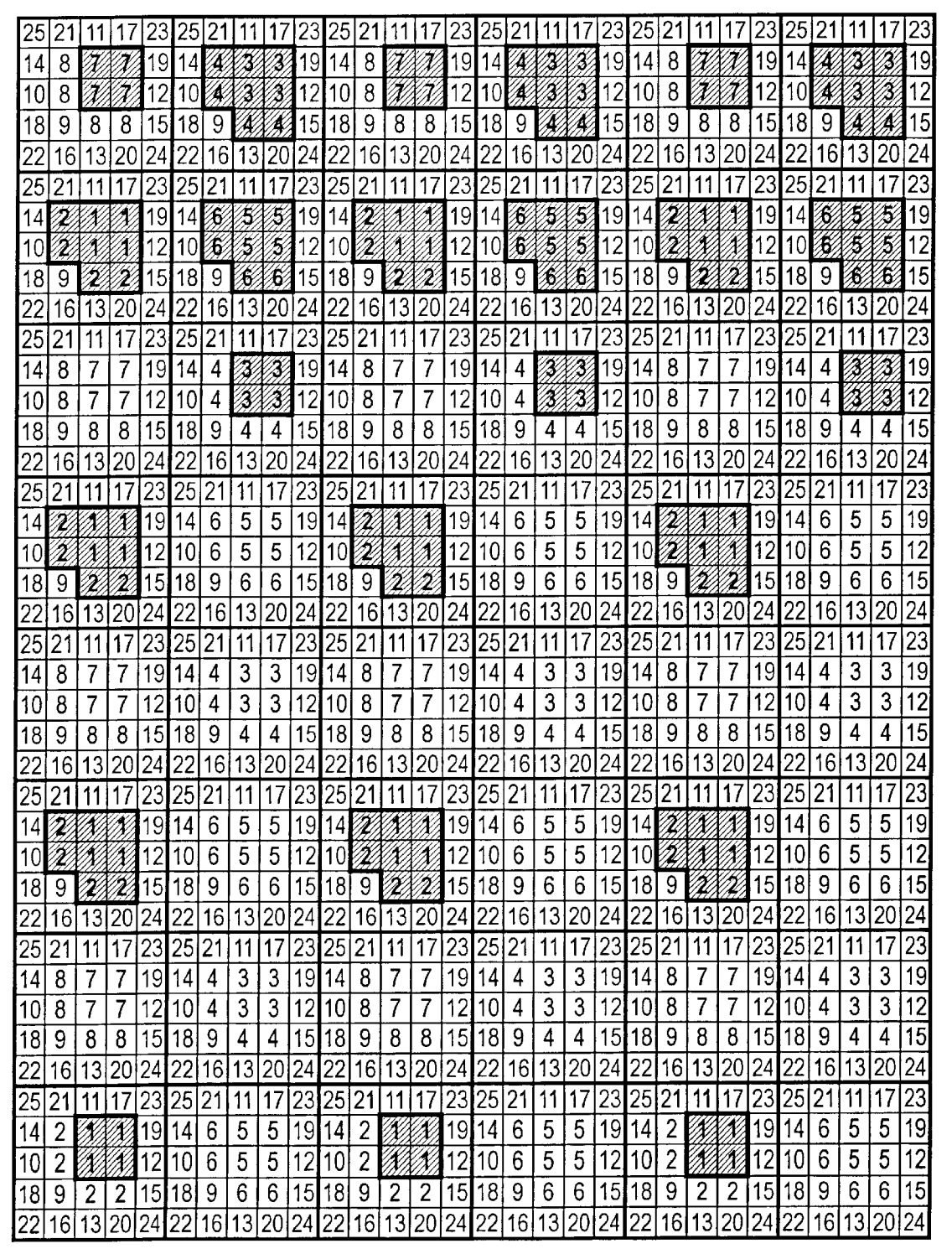

FIG. 65 shows the half-tone image obtained by converting the digitized image of FIG. 48 using the above-described conversion method, i.e. using the distribution and filling order for unit zones in the supercell as given by FIG. 52.

Figure 66:
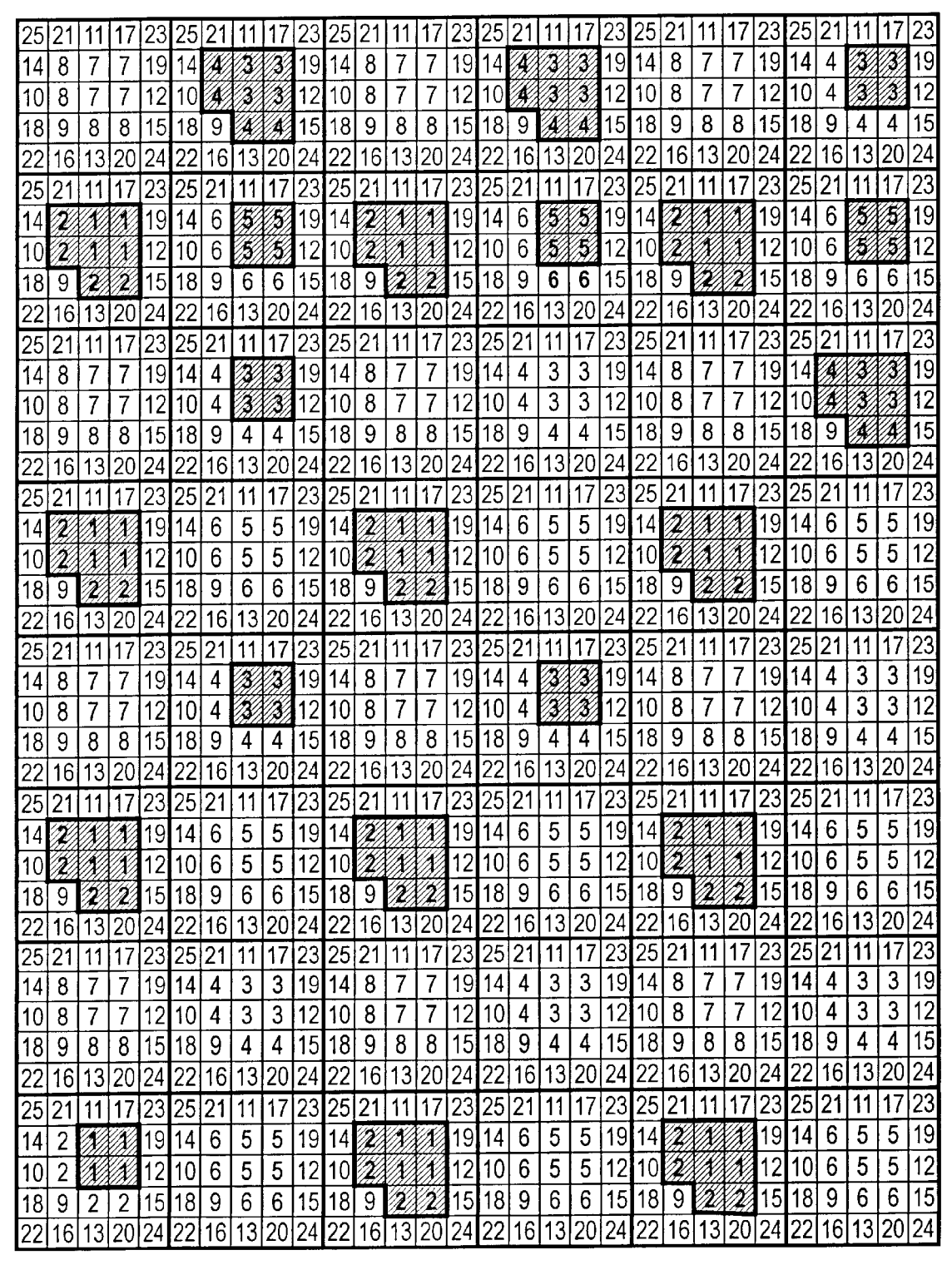

FIG. 66 shows the half-tone image obtained by converting the digitized image of FIG. 50 using the above conversion method.

On comparing FIGS. 66 and 51 in particular, it will be observed that half-tone images obtained differ depending on the distribution model and the filling order used for the unit zones.

Using the distribution and filling order of unit zones as given by FIG. 52, the base cell situated top left in the figure has no inked unit zone so long as the corresponding pixel tone value of the analysis window is less than or equal to 6.

The base cell situated top right in FIG. 52 has no inked unit zone so long as the corresponding pixel tone value of the analysis window is less than or equal to 2.

The base cell situated bottom right in FIG. 2 has no inked unit zone so long as the corresponding pixel tone value of the analysis window is less than or equal to 4.

In some cases, with the digitized image of FIG. 50, only one of the base cells of the supercell has any inked unit zones even though some of the pixels in the analysis window have tone values greater than or equal to 2.

This applies, for example, to the analysis window situated bottom left in FIG. 51, which is converted in the half-tone image of FIG. 66 by a supercell in which only one of the base cells, situated bottom left, has a slab with four inked unit zones.

FIGS. 67 to 75 show a third way of filling the supercell M.

FIGS. 68 to 71 show the inked areas of the supercell M when all of the pixels in the analysis window have tone values respectively equal to 1, 2, 3, and 4.

As can be seen on examining these figures, the supercell M is filled by slabs of four unit zones each.

The distribution of the -inked unit zones within each of the base cells constituting the supercell M differs from one base cell to another.

Figure 74:
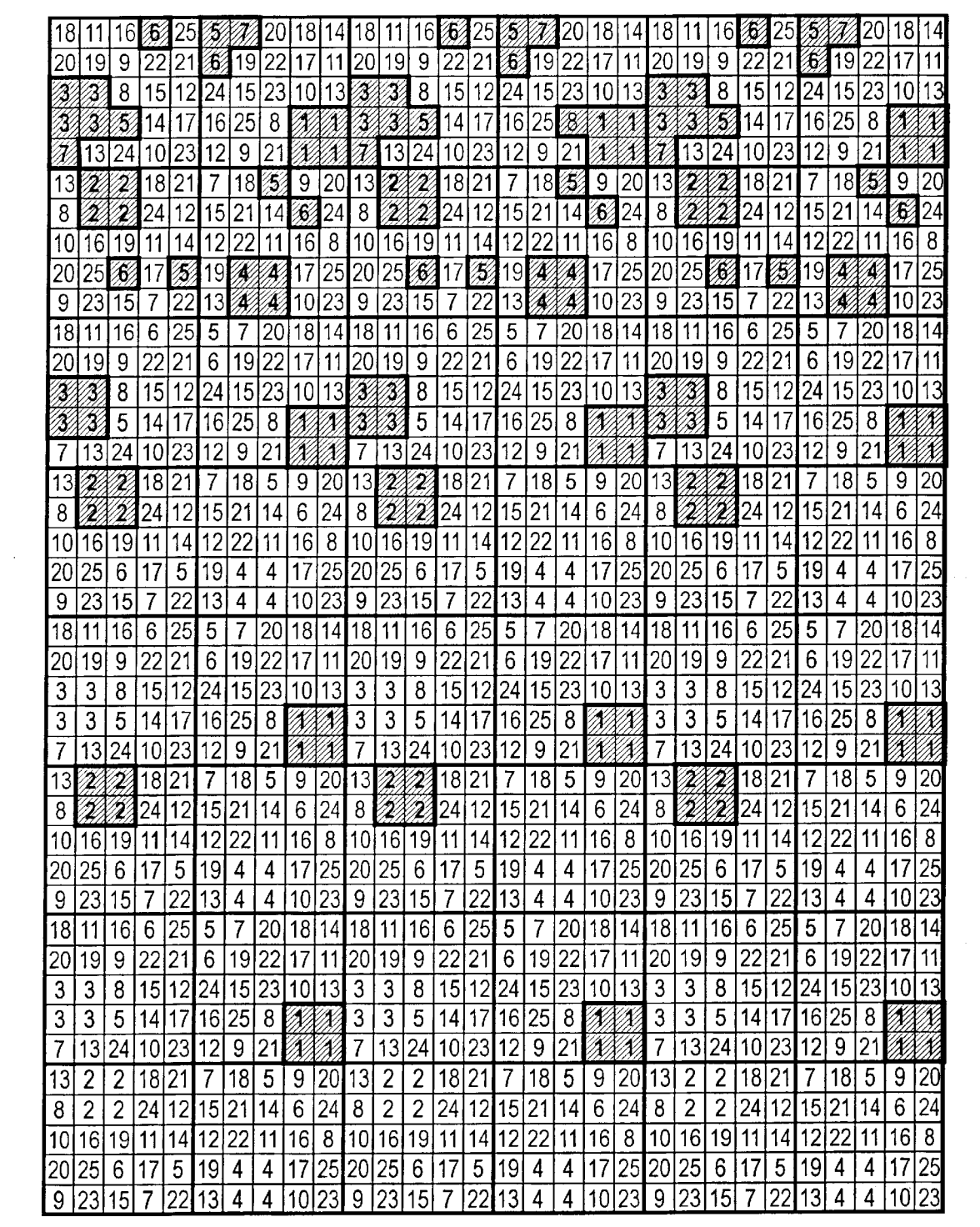

FIG. 74 shows the half-tone image obtained by implementing the above-described conversion method to the digitized image of FIG. 48.

Figure 75:
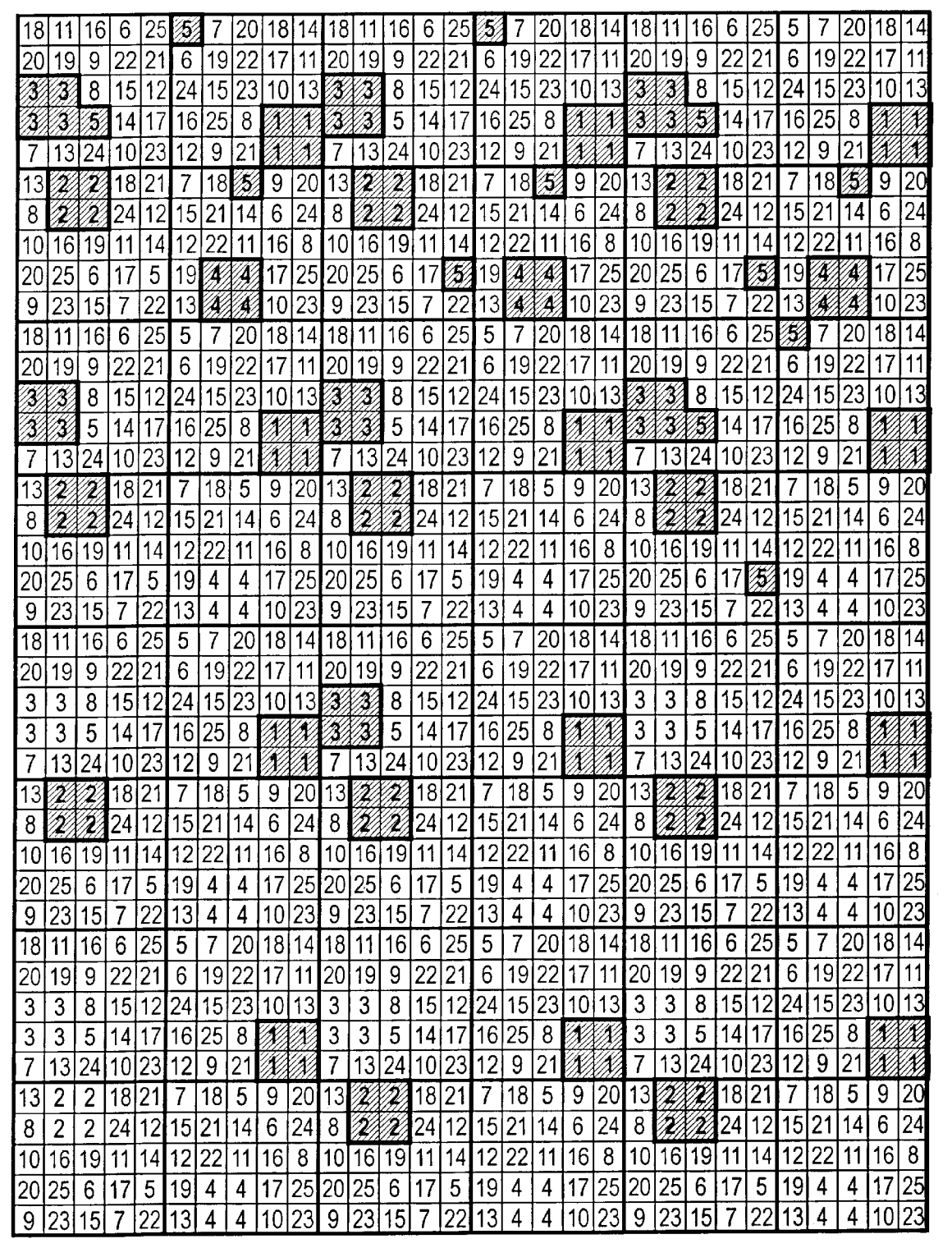

FIG. 75 shows the half-tone image obtained by converting the digitized image of FIG. 50.

In addition to solving the problem of reproducing pale tones by grouping together inked unit zones in the manner described above, the invention also makes it possible to solve the problem of isolated non-inked areas becoming plugged by the accretion phenomenon, as occurs for example when only one unit zone within the base cell is not inked.

FIGS. 76 to 84 show the way in which the supercell M is filled in a fourth implementation of the conversion method of the invention when all of the pixels in the analysis window have identical tone values that are greater than 16.

The uninked unit zones are grouped together in slabs of four, and the number of such slabs is selected so as to obtain the desired filling ratio for the supercell M.

The non-inked areas grouped together in this way are then less subject to becoming plugged during printing, because they are of larger dimensions.

Beneath a predetermined tone value, specifically tone value 22 in the example under consideration, filling is performed without grouping together the non-inked unit zones in slabs, since the non-inked zones are not isolated under those circumstances but contiguous with at least one other non-inked unit zone in the same base cell or in an adjacent base cell.

Figure 85:
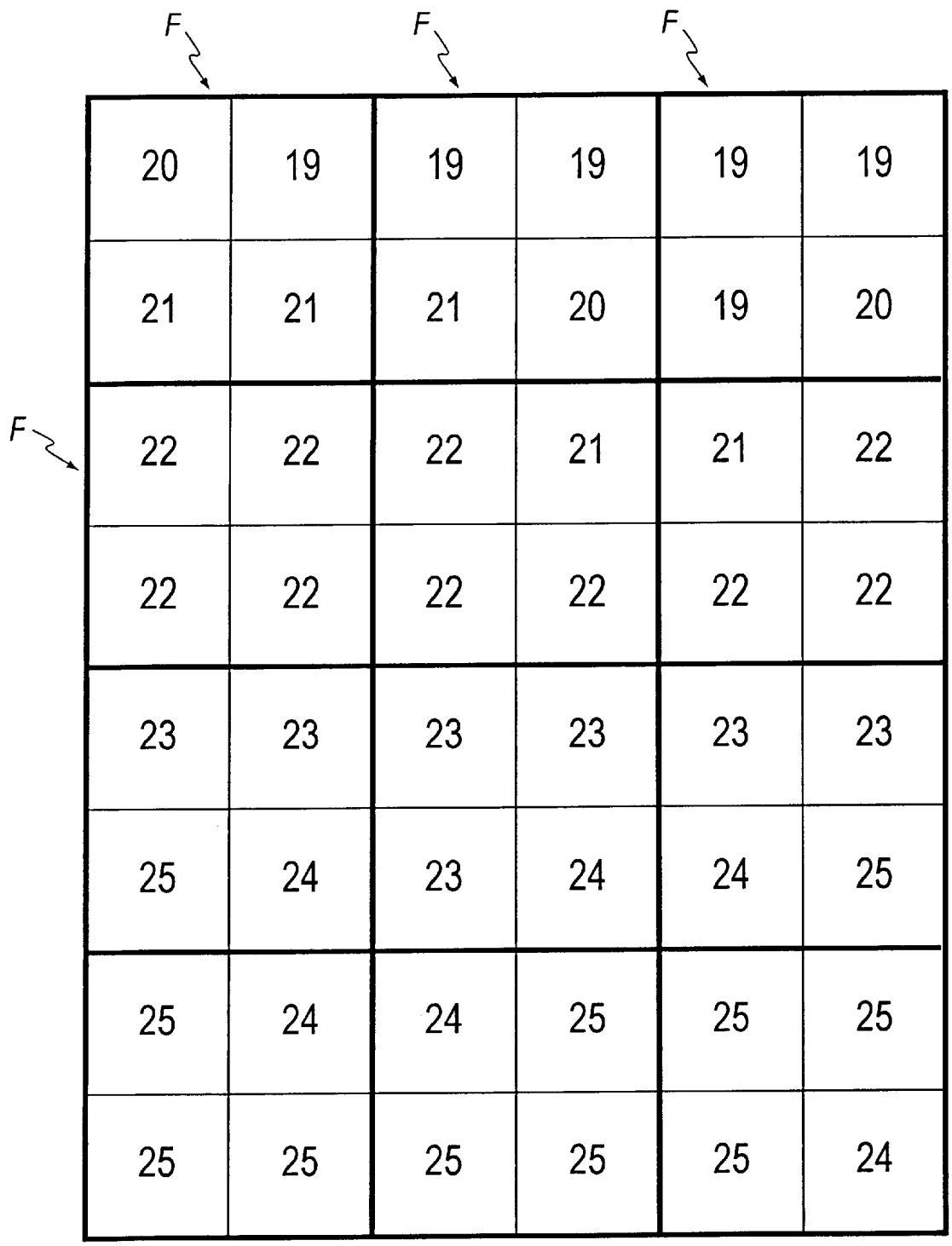

FIG. 85 shows a digitized image with a plurality of dark tones.

Figure 86:
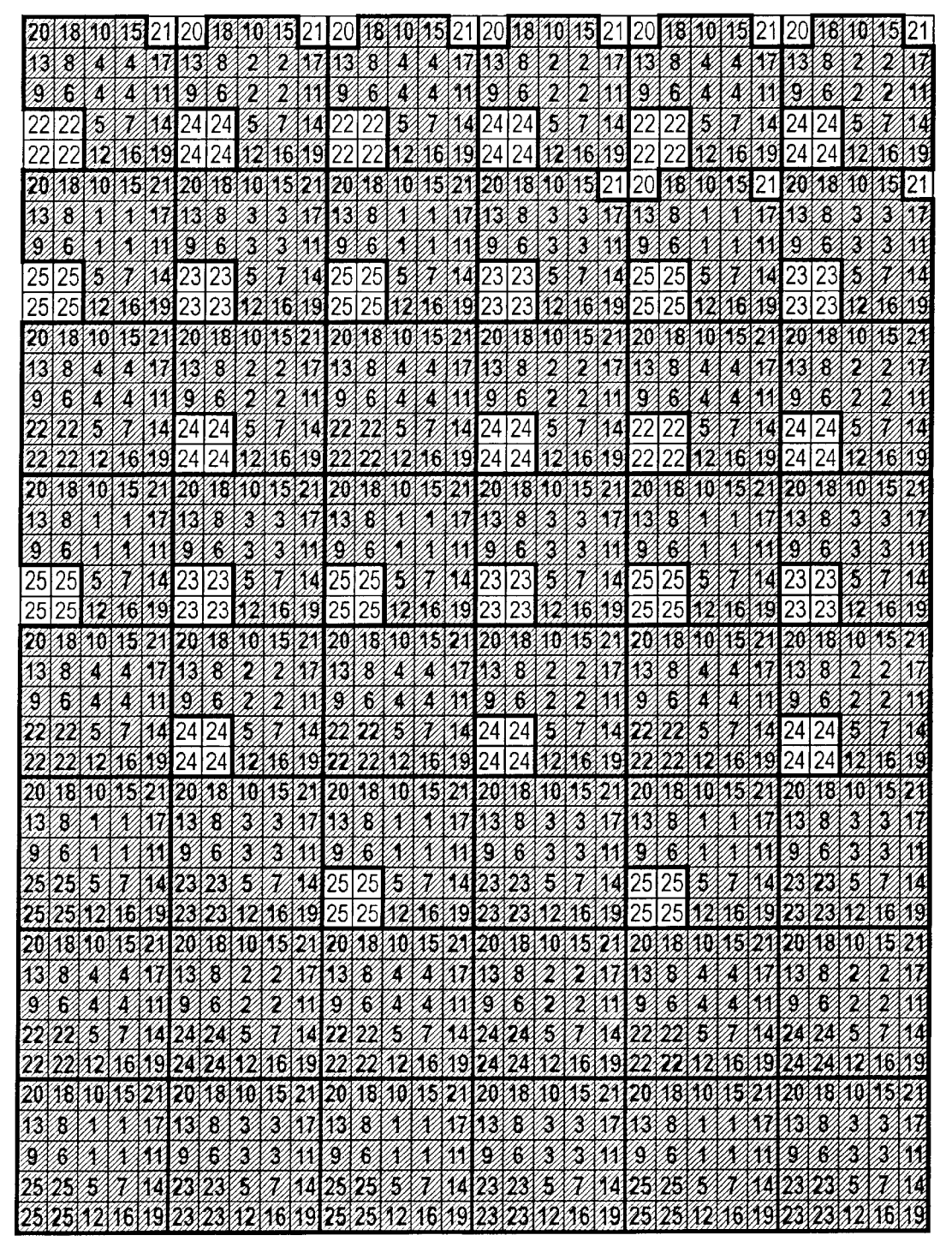

FIG. 86 shows the half-tone image obtained by the conversion method implementing the distribution and filling order of unit zones given in FIGS. 76 to 84.

It will be observed that the base cell situated bottom left in the supercell has all of its unit zones inked so long as the tone value of the corresponding pixel in the analysis window is greater than or equal to 23.

The base cell situated bottom left in the supercell has all of its unit zones inked so long as the tone value of the corresponding pixel of the analysis window is greater than or equal to 24.

The same applies to the base cells situated top left and top right in the supercell.

Given the distribution and the filling order of unit zones in the supercell, the analysis window situated bottom left in the digitized image of FIG. 85 is converted into a supercell in which all four base cells are fully inked.

The same applies to the analysis window situated bottom right in FIG. 85.

As a result of the conversion method in this implementation of the invention, it can happen in some cases that the values of the pixels of the analysis window are not converted into an accurately equivalent ratio of inked area to non-inked area, but to a ratio that is approximately accurate.

Nevertheless, in practice it turns out that the tone errors associated with the conversion method of the invention are difficult to perceive.

Naturally, the invention is not limited to the implementations given above, and the teaching thereof can naturally be combined in various ways by the person skilled in the art to provide new variants.

In particular, it is possible to modify the number of pixels constituting an analysis window and thus the number of base cells constituting each supercell, as a function of the desired result and/or as a function of the printing technique used.

It is also possible to implement a supercell constituted by a given number of base cells, when a pale tone is to be reproduced and to implement a supercell constituted by some other number of base cells when a dark tone is to be reproduced, given that the conversion method of the invention makes it possible to improve either reproduction of pale tones or reproduction of dark tones, or both.

The invention is applicable regardless of the shape of the base cell.

The invention is naturally applicable to making a half-tone image in the context of a multiple color printing method.

Under such circumstances, the ability to reproduce pale and/or dark tones more faithfully by the invention makes it possible to reduce color drift in pale or dark tones.

What is claimed is:

1. A conversion method for generating a half-tone image from a digitized image comprising a set of pixels each having a tone value, with each pixel of the digitized image being associated with a base cell of the half-tone image, said base cell being subdivided into as many unit zones as there are non-zero tone values, the method comprising:

analyzing the digitized image in terms of analysis windows each constituted by grouping together a predetermined number of pixels; and at least when the tone value of at least one of the pixels in an analysis window falls within a first predetermined set of tone values, converting the tone value of each of the pixels of the analysis window into respective selected ratios of inked area to non-inked area in various base cells corresponding respectively to said pixels, said base cells together forming a supercell, said conversion being performed by complying with a predetermined distribution and filling order of unit zones that is a function of the tone value to be converted, said distribution and said filling order also taking account of a printing technique used for reproducing the half-tone image on a medium, a resulting image having two zones with different screen pitches without any sharp transition therebetween.

2. A method according to claim 1, wherein conversion to the respective selected ratios of inked area to non-inked area in the various base cells of the supercell is performed by complying with the predetermined distribution and filling order for unit zones that is the function of the tone value to be converted, and doing so for every individual tone value of the pixels in the analysis window.

3. A method according to claim 1, wherein, when all of the tone values of the pixels in the analysis window fall within a second predetermined set of tone values, the unit zones of all of the base cells of the supercell are filled in a same manner.

4. A method according to claim 1, wherein said predetermined distribution and filling order serve to group together filled unit zones within the supercell when the tone value of at least one of the pixels of the analysis window is below a given threshold.

5. A method according to claim 4, wherein the filled unit zones are grouped together in slabs of n unit zones within each base cell belonging to the supercell, n being a multiple of a number of base cells constituting the supercell.

6. A method according to claim 1, wherein said predetermined distribution and filling order serve to group together empty unit zones within the supercell when the tone value of at least one of the pixels of the analysis window is greater than a given threshold.

7. A method according to claim 6, wherein the empty unit zones are grouped together in slabs of n unit zones within each base cell belonging to the supercell where n is a multiple of a number of base cells constituting the supercell.

8. A method according to claim 5, wherein each slab is positioned in a center of the base cell in which it is to be found.

9. A method according to claim 7, wherein each slab is positioned in a center of the base cell in which it is to be found.

10. A method of reproducing a digitized image by a printing technique such as wet offset, dry offset, gravure, silk screen printing, rubber stamping, or flexographic printing, implementing an ink transfer member on which the tones of the pixels of the image to be reproduced are converted into selected ratios of inked areas to non-inked areas by a conversion method as defined in claim 1.

11. A method according to claim 10, wherein the printing technique used is gravure printing.

12. A method according to claim 10, wherein the printing technique used is wet offset printing.

13. A method according to claim 10, wherein the printing technique used is dry offset printing.

14. A method according to claim 10, wherein the printing technique used is flexographic printing.

15. A method according to claim 10, wherein the printing technique used is silk screen printing.

16. A method according to claim 10, wherein the printing technique used is rubber stamping.

17. A method of reproducing a digitized image by an ink jet printing technique, wherein a half-tone is printed as obtained by a conversion method as defined in claim 1.

18. An ink transfer member obtained by implementing the method according to claim 1 comprising a zone for reproducing various pale tones, wherein said zone has a plurality of inked areas of identical dimensions and non-inked inked areas of dimensions greater than or equal to those of a base cell.

19. An ink transfer member obtained by implementing the method according to claim 1 comprising a zone for reproducing various dark tones, wherein said zone has a plurality of non-inked areas of identical dimensions and inked areas of dimensions that are greater than or equal to those of a base cell.

20. A printed medium obtained by implementing the method according to claim 1 comprising a zone reproducing various pale tones, wherein said zone has a plurality of inked areas of identical dimensions and non-inked areas of dimensions greater than or equal to those of a base cell.

21. A printed medium obtained by implementing the method according to claim 1 comprising a zone reproducing various dark tones, wherein said zone presents a plurality of non-inked areas of identical dimensions and inked areas of dimensions greater than or equal to those of a base cell.

22. A medium obtained by implementing the method according to claim 10.

* * * * *